US011652534B2

(12) United States Patent
Khan et al.

(10) Patent No.: US 11,652,534 B2
(45) Date of Patent: May 16, 2023

(54) ADAPTIVE ADVANCED RECEIVERS BASED ON PACKET ERROR RATE

(71) Applicant: QUALCOMM Incorporated, San Diego, CA (US)

(72) Inventors: Touseef Khan, San Diego, CA (US); Sitaramanjaneyulu Kanamarlapudi, San Diego, CA (US); Ritesh Sood, San Jose, CA (US); Ajay Vignesh Jayaprakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/451,472

(22) Filed: Oct. 19, 2021

(65) Prior Publication Data
US 2022/0131595 A1 Apr. 28, 2022

Related U.S. Application Data

(60) Provisional application No. 63/104,326, filed on Oct. 22, 2020.

(51) Int. Cl.
*H04B 7/08* (2006.01)
*H04L 1/20* (2006.01)
*H04L 1/00* (2006.01)

(52) U.S. Cl.
CPC ......... *H04B 7/0854* (2013.01); *H04B 7/0857* (2013.01); *H04B 7/0865* (2013.01); *H04L 1/203* (2013.01); *H04L 1/0003* (2013.01)

(58) Field of Classification Search
CPC .. H04B 7/0854; H04B 7/0857; H04B 7/0865; H04B 7/0874; H04L 1/203; H04L 1/0003; H04L 1/0001; H04L 1/0016; Y02D 30/70
See application file for complete search history.

(56) References Cited

U.S. PATENT DOCUMENTS 7,277,679 B1 * 10/2007 Barratt ................. H04B 17/309
455/135
8,014,744 B1 * 9/2011 Kopikare ............ H04B 7/0814
455/272

(Continued)

FOREIGN PATENT DOCUMENTS

WO 2017142369 A1 8/2017

OTHER PUBLICATIONS

International Search Report and Written Opinion—PCT/US2021/071944—ISA/EPO—dated Jan. 19, 2022.

*Primary Examiner* — Jean B Corrielus
(74) *Attorney, Agent, or Firm* — Qualcomm Incorporated

(57) ABSTRACT

Aspects are provided which allow a UE to manage a number of antennas in adaptive receive diversity (ARD) based on packet error rate (PER). The UE measures a downlink PER and determines a number of antennas for receiving a downlink transmission based on the measured, downlink PER. The UE measures downlink PER during switching from a fallback state to a steady state in an ARD state machine, and the UE changes a size of a fallback window in the ARD state machine based on the measured, downlink PER. The UE also disables switching from the steady state to the fallback state based on the measured downlink PER. As a result, a balance between UE reception performance and power savings is maximized and improved downlink data throughput is achieved.

22 Claims, 9 Drawing Sheets

(56) References Cited

U.S. PATENT DOCUMENTS

| | | | |
|---|---|---|---|
| 8,838,048 B2* | 9/2014 | Yamada | H04B 7/0874 |
| | | | 455/273 |
| 2004/0147289 A1* | 7/2004 | Paljug | H04B 7/0814 |
| | | | 455/562.1 |
| 2014/0269994 A1 | 9/2014 | Homchaudhuri et al. | |

* cited by examiner

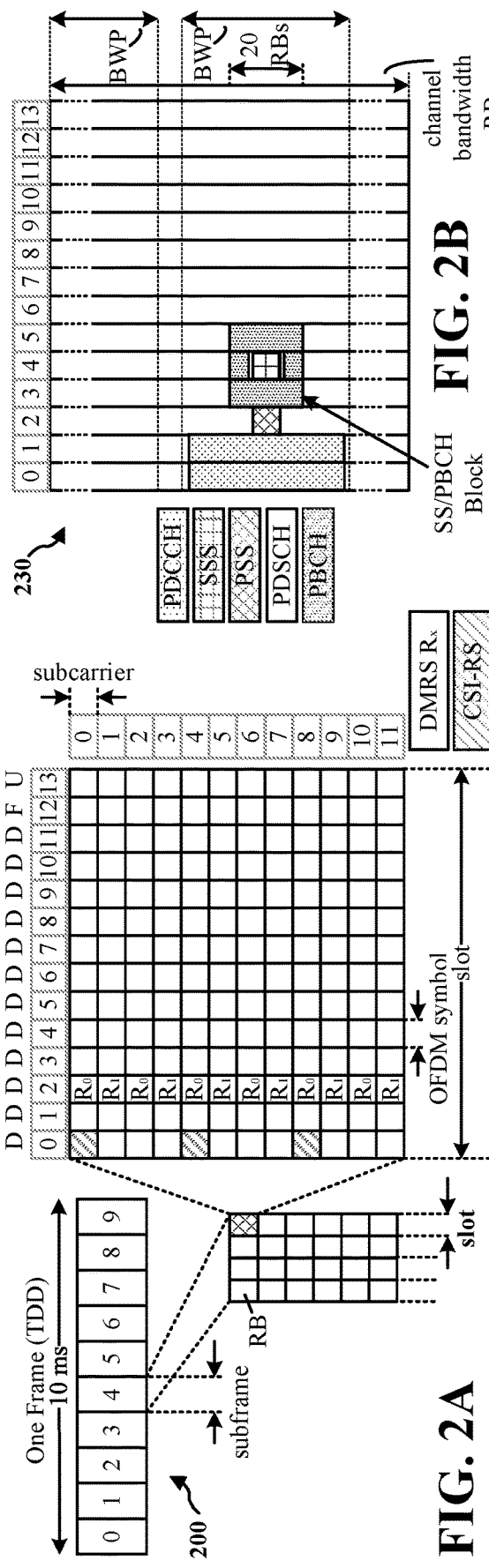
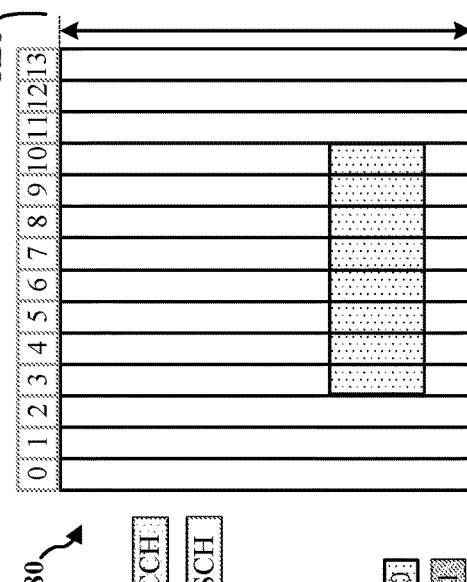
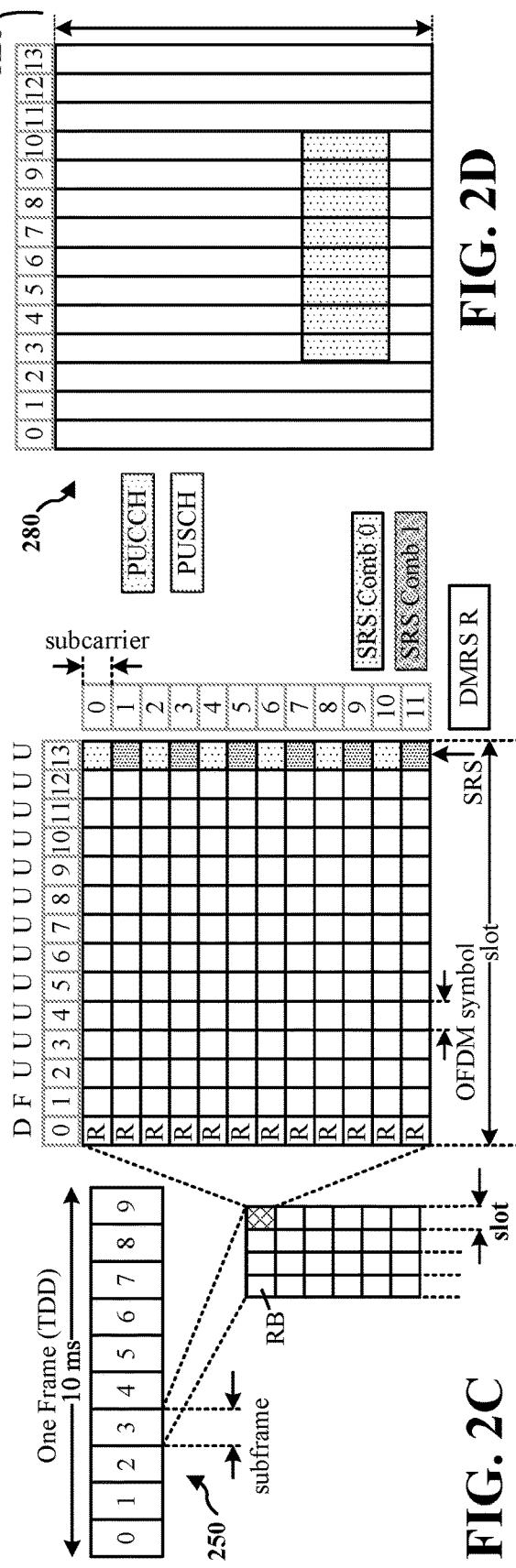
FIG. 2A
FIG. 2B
FIG. 2C
FIG. 2D

ADAPTIVE ADVANCED RECEIVERS BASED ON PACKET ERROR RATE

CROSS REFERENCE TO RELATED APPLICATION(S)

This application claims the benefit of U.S. Provisional Application Ser. No. 63/104,326, entitled "ADAPTIVE ADVANCED RECEIVERS BASED ON PACKET ERROR RATE" and filed on Oct. 22, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus measures a downlink packet error rate (PER); and determines a number of antennas for receiving a downlink transmission based on the measured, downlink PER.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
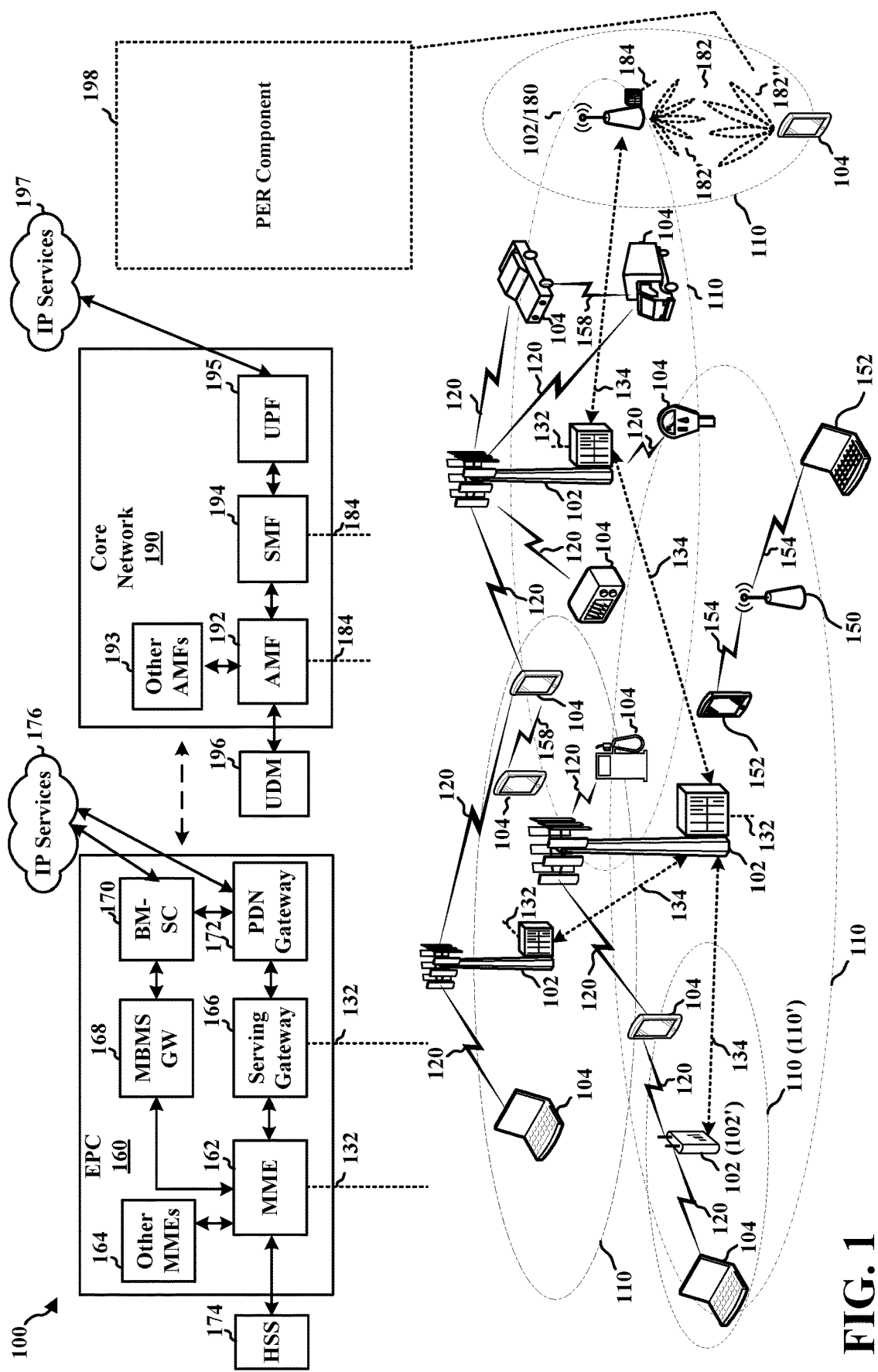
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In adaptive receive diversity (ARD), a UE may manage a number of reception antennas in order to balance power consumption and performance. The UE may adapt its reception (Rx) antennas depending on one or more metrics, for example, radio frequency conditions, a downlink traffic pattern (i.e. a number of downlink grants received over a threshold number of subframes), a downlink scheduling rate (i.e. an average number of downlink grants received per subframe), a reference signal received power (RSRP), a signal-to-noise ratio (SNR), spectral efficiency, or antenna correlation. For instance, based on one or more of these metrics, a UE with four Rx antennas may transition between different Rx states including one active Rx antenna (1Rx), two active baseline Rx antennas (baseline2Rx, or a default pair of antennas), two active best Rx antennas (best2Rx, or any pair of antennas), and four active Rx antennas (4Rx). When the UE moves between the different Rx states, the UE may report its current, maximum receive capability to the base station through channel state feedback (CSF). For example, the UE may report a rank indicator (RI) indicating a rank of the UE in multiple-input-multiple-output (MIMO) communication. For instance, if the UE is in the 4Rx state, the UE may report a RI of 3 or 4 informing the base station of a current reception capability up to four layers, while if the UE is in the best2Rx state, the UE may report a RI of 2 informing the base station of a current reception capability only up to two layers. The base station may then transmit scheduling grants to the UE over four or less layers accordingly based on the report. Thus, ARD may allow the UE to balance power savings (e.g. by switching to an Rx state with a lower number of active reception antennas such as 1Rx) with performance (e.g. by switching to an Rx state with a higher number of active reception antennas such as 4Rx) while maintaining communication with the base station.

In addition to transitioning between the aforementioned Rx states, the UE may also transition between different macro states. These macro states may be part of an ARD state machine of the UE, and may include an advanced receiver (ARx) standby state, an ARx disallowed state, and a force rank 1 (R1) state. The Rx states may also be dependent upon the current macro state of the UE. For example, when a UE with 4 reception antennas is in the ARx standby state, the UE may select between the 4Rx state or the best2Rx state. When the UE is in the ARx disallowed state, the UE may be restricted to the baseline2Rx state. If the UE is in the force R1 state, the UE may be forced to the 1Rx state to save power and to report CSF of MIMO rank 1 during this time.

The UE may switch between different macro states depending on the downlink scheduling rate of the base station, which refers to the average number of downlink grants the UE receives per subframe. For example, the UE may enter the ARx standby state when the UE expects significant downlink traffic over time (e.g. where the downlink scheduling rate is at or above 10%), the ARx disallowed state when the downlink scheduling rate is low (e.g. where the downlink scheduling rate is below 10% but at or above 2%), and the force R1 state when the downlink utilization is trivial (e.g. where the downlink scheduling rate is below 2%). An example illustrating downlink scheduling rates is described below with respect to FIGS. 4A and 4B.

Each macro state (e.g. ARx standby and ARx disallowed) may have different sub-states or modes, including a steady state and a fallback state. The steady state is a default sub-state which the UE enters when it expects downlink traffic (e.g. when the UE receives a downlink grant). While in the steady state, the UE may select one of the default Rx states of the corresponding macro state. For example, the UE may select between 4Rx and best2Rx while in the steady state of the ARx standby state, or baseline 2Rx while in the steady state of the ARx disallowed state.

In contrast, the fallback state is a sub-state which the UE enters when downlink traffic is idle. For example, the UE may enter the fallback state if the UE has not received a downlink grant within a threshold number of subframes. While in the fallback state, the UE may be restricted to selecting 1Rx (e.g. in a conditional 1Rx mode). Thus, the UE may save more power in the fallback state (e.g. with 1Rx) than when the UE is in the steady state (e.g. with 4Rx or best2Rx). In some cases, while in the fallback state, the UE may also select baseline2Rx as an alternative to 1Rx to maintain PDCCH reception performance.

The UE may switch between the steady state and fallback state for a given macro state based on a downlink traffic pattern for that macro state. The downlink traffic pattern refers to the number of downlink grants the UE receives over a threshold number of subframes. The threshold number of subframes may be configured by the base station and depend on the given macro state. For instance, the threshold may be 48 subframes for the ARx standby state and 20 subframes for the ARx disallowed state. The time period represented by this threshold number of subframes (e.g. 48 or 20 subframes) may be referred to as a fallback window. If a UE in the steady state for a given macro state does not receive a downlink grant within the fallback window for that macro state, the UE enters the fallback state. If the UE in the fallback state later receives a downlink grant, the UE re-enters the steady state.

Generally, in ARD, the UE only reports CSF to the base station while in a steady state. For example, while the UE is in the steady state of the ARx standby state, the UE may report a MIMO rank of four to the base station in CSF indicating that the UE is operating under 4Rx. Therefore, if the UE later transitions from steady state to a fallback state based on downlink traffic patterns or scheduling rates as described above, the UE may not report the downgrade from 4Rx to 1Rx/baseline2Rx in CSF while in the fallback state. Moreover, the UE may take a significant amount of time (e.g. 4-10 ms) to transition from the fallback state back to the steady state to again report CSF. As a result, misalignment or mismatch between the number of layers for transmission and the number of antennas for reception may occur during the transition time between steady states and fallback states. Such mismatch may be especially prominent when the UE has dropped from 4Rx to 1Rx.

Due to this mismatch or lack of synchronization with the base station, the UE may prune or discard numerous downlink grants on PDCCH. For instance, while the UE is in a fallback state, the UE may discard 4 to 10 downlink grants during the 4 to 10 ms transition time back to the steady state. Moreover, the UE may fail to successfully receive downlink data on PDSCH during this transition time, for instance, due to numerous decoding failures of cyclic redundancy checks (CRCs) on PDSCH. As a result, the UE may frequently discard the PDSCH data and transmit non-acknowledgments (NACKs) to the base station during automatic repeat request (ARQ) or hybrid automatic repeat request (HARD) reporting. When the base station receives the NACKs from the UE, the base station may determine to adapt its downlink transmissions, such as in outer loop link adaptation (OLLA), by reducing the modulation coding scheme (MCS) of subsequent data transmissions, the number of allocated resource blocks for subsequent transmissions, the frequency of grants scheduling subsequent transmissions, or other parameters. Such adaptation may result in a degradation of downlink data throughput when the UE is back in the steady state.

Moreover, the lack of synchronization and degradation of downlink data throughput may be especially prominent in secondary component carriers (SCCs) where high and low downlink traffic may be more intermittent (e.g. in bursts), than in primary component carriers (PCCs) where high downlink traffic may be more constant. For example, the UE may receive data from the base station over a PCC and multiple SCCs. For each PCC and SCC, the UE may initially be in the steady state of a given macro state, during which the UE may report a MIMO rank of 3 or 4 for each component carrier. If the UE later detects a low amount of downlink traffic on any of the SCCs (e.g. zero downlink grants within a threshold number of subframes), the UE may transition to the corresponding fallback state on those SCCs with a reduced number of active antennas (e.g. 1 or 2). As a result, the UE may experience a high packet error rate or ratio (PER) (also referred to as block error rate or ratio (BLER)) due to frequent pruning or discarding of downlink grants on PDCCH and CRC decoding failures on PDSCH in these SCCs. While the UE may in some cases recover lost data on PDSCH in response to multiple HARQ-level retransmissions or other ARQ mechanism, the overall round trip time (RTT) for the UE to receive and successfully acknowledge the data may be increased. Additionally, transmission control protocol (TCP) window sizes of the SCCs may be throttled at the transport layer due to the downgrade of number of antennas, resulting in an overall reduction of downlink throughput which may impact the UE experience. Persistent PER may also trigger OLLA (including reduction in MCS and scheduling as described above), which may further degrade downlink performance.

One approach that may improve downlink performance is to double the fallback window. For example, if the fallback window for the ARx standby state is increased from 48 ms (e.g., spanning 48 subframes) to 96 ms (e.g., spanning 96 subframes), the UE may remain in the steady state for twice the original amount of time before transitioning to the fallback state. As a result, the UE may remain in 4Rx for a longer amount of time, potentially reducing the PER and improving performance.

However, while fixedly increasing the size of the fallback window may reduce PER, such static increase may also inefficiently increase UE power consumption. For example, if the fallback window in the ARx standby state is doubled such that the UE spends twice the original amount of time in 4Rx before switching to the fallback state, the UE may effectively double its power consumption (or halve its power savings). Such loss in power savings may be especially inefficient in SCCs where there may be downlink inactivity for frequent periods of time, during which the UE may burn additional power, reduce battery life, or possibly experience other thermal triggers.

To resolve the power inefficiencies associated with statically increasing the size of the fallback window in ARD as described above, the UE may employ a more dynamic approach to enhance ARD performance. For example, the UE may dynamically increase the size of the fallback window, and thus the amount of time the UE remains in a steady state before switching to a fallback state, based on a measurement of PER. PER refers to the number of erroneous packets or transport blocks which the UE receives with at least one bit error over the total number of received packets or transport blocks. For example, the UE may measure PER over a given period of time by counting the number of transport blocks which the UE fails to decode during that time (e.g. in response to a mismatch between the CRC attached to the transport block and an expected CRC calculated by the UE) and dividing that number by the total number of transport blocks received at the UE during that time. Thus, if the UE receives 10 transport blocks during a predetermined period of time and fails to decode 2 of these blocks (e.g. due to CRC mismatch), the UE may measure a PER of 20%. Depending on the measured PER, the UE may determine a scaling factor for the fallback window (e.g. 1×, 1.5×, or 2× of the size of the original fallback window). Accordingly, the UE may dynamically change the length of time that the UE remains in the steady state based on measured PER, rather than merely increasing the time by a fixed amount regardless of PER. In this way, balance between power savings and performance may be optimized.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PER component 198 that is configured to measure a downlink PER and determine a number of antennas for receiving a downlink transmission based on the measured, downlink PER.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
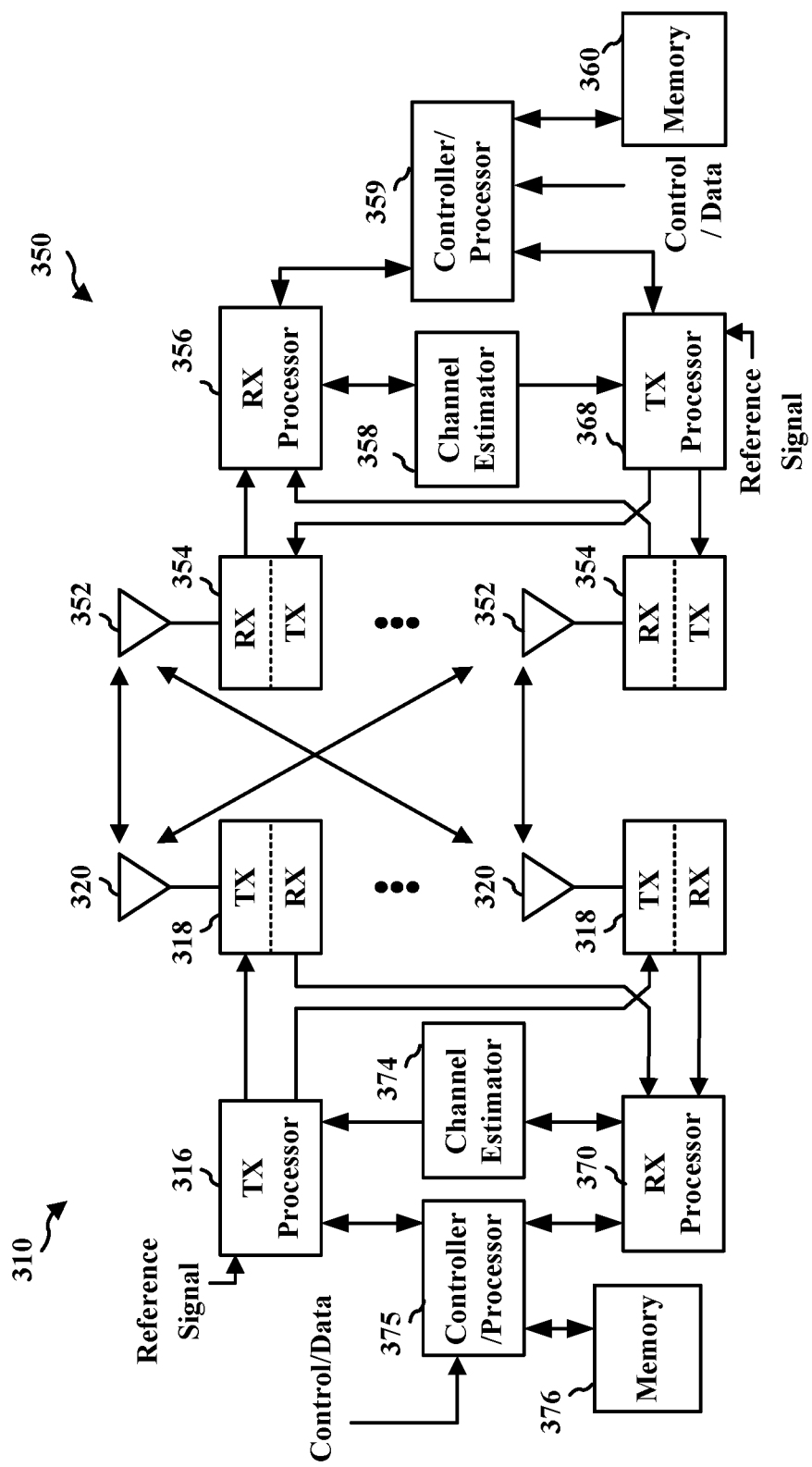
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with PER component 198 of FIG. 1.

In ARD, a UE may manage a number of reception antennas in order to balance power consumption and performance. The UE may adapt its Rx antennas depending on one or more metrics, for example, radio frequency conditions, a downlink traffic pattern (i.e. a number of downlink grants received over a threshold number of subframes), a downlink scheduling rate (i.e. an average number of downlink grants received per subframe), a RSRP, a SNR, spectral efficiency, or antenna correlation. For instance, based on one or more of these metrics, a UE with four Rx antennas may transition between different Rx states including one active Rx antenna (1Rx), two active baseline Rx antennas (baseline2Rx, or a default pair of antennas), two active best Rx antennas (best2Rx, or any pair of antennas), and four active Rx antennas (4Rx). When the UE moves between the different Rx states, the UE may report its current, maximum receive capability to the base station through CSF. For example, the UE may report a RI indicating a rank of the UE in MIMO communication. For instance, if the UE is in the 4Rx state, the UE may report a RI of 3 or 4 informing the base station of a current reception capability up to four layers, while if the UE is in the best2Rx state, the UE may report a RI of 2 informing the base station of a current reception capability only up to two layers. The base station may then transmit scheduling grants to the UE over four or less layers accordingly based on the report. Thus, ARD may allow the UE to balance power savings (e.g. by switching to an Rx state with a lower number of active reception antennas such as 1Rx) with performance (e.g. by switching to an Rx state with a higher number of active reception antennas such as 4Rx) while maintaining communication with the base station.

In addition to transitioning between the aforementioned Rx states, the UE may also transition between different macro states. These macro states may be part of an ARD state machine of the UE, and may include an ARx standby state, an ARx disallowed state, and a force R1 state. The Rx states may also be dependent upon the current macro state of the UE. For example, when a UE with 4 reception antennas is in the ARx standby state, the UE may select between the 4Rx state or the best2Rx state. When the UE is in the ARx disallowed state, the UE may be restricted to the baseline2Rx state. If the UE is in the force R1 state, the UE may be forced to the 1Rx state to save power and to report CSF of MIMO rank 1 during this time.

The UE may switch between different macro states depending on the downlink scheduling rate of the base station, which refers to the average number of downlink grants the UE receives per subframe. For example, the UE may enter the ARx standby state when the UE expects significant downlink traffic over time (e.g. where the downlink scheduling rate is at or above 10%), the ARx disallowed state when the downlink scheduling rate is low (e.g. where the downlink scheduling rate is below 10% and at or above 2%), and the force R1 state when the downlink utilization is trivial (e.g. where the downlink scheduling rate is below 2%). An example illustrating downlink scheduling rates is described below with respect to FIGS. 4A and 4B.

Figure 4A:
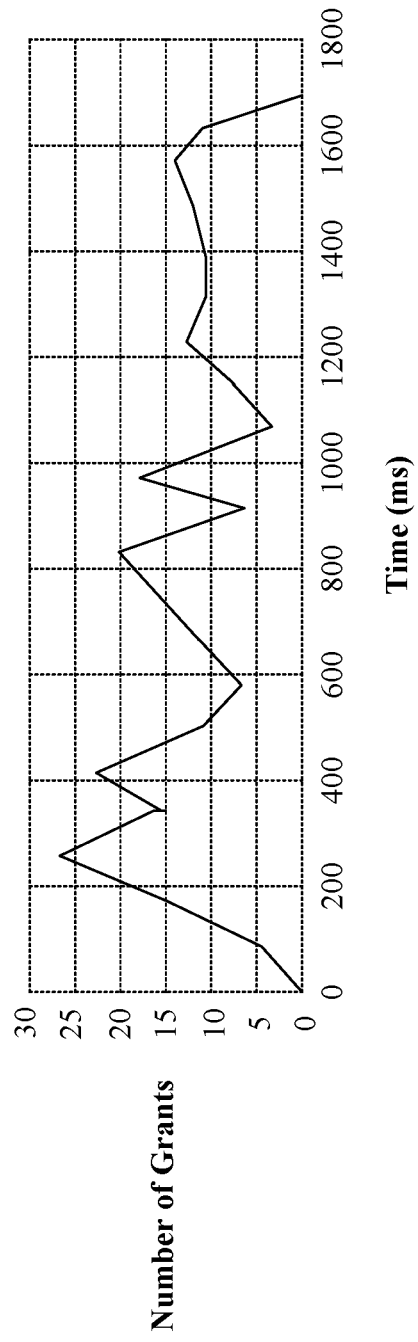
FIGS. 4A and 4B are diagrams illustrating a graphical comparison of downlink scheduling rates with a number of received grants over time.
Figure 4B:
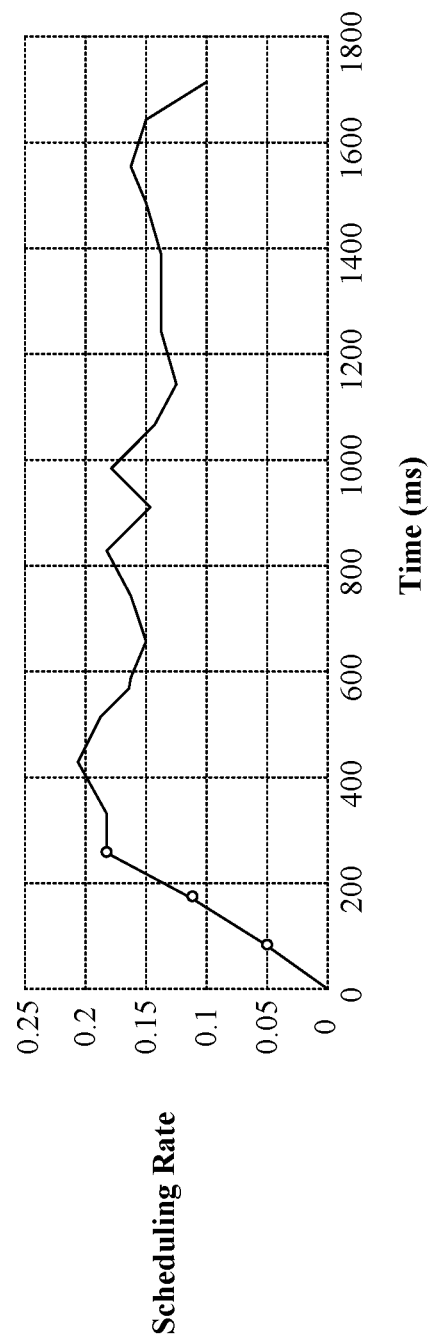

FIGS. 4A and 4B illustrate examples 400, 450 of graphs depicting a comparison of downlink scheduling rates with a number of received grants over time. Each sample is taken at 80 ms intervals in this example, although in other examples other intervals may be used for sampling. In this example, the UE receives a total of 4 downlink grants from the base station after 80 ms, a total of 18 downlink grants from the base station after 160 ms, a total of 44 downlink grants from the base station after 240 ms, and so forth as illustrated in FIG. 4A. Accordingly, assuming each subframe spans 1 ms, the downlink scheduling rate after 80 ms may be 0.05 or 5% (i.e. 4 grants/80 ms, or 0.05 grants per ms/subframe), the downlink scheduling rate after 160 ms may be 0.11 or 11% (i.e. 18 grants/160 ms, or 0.1125 grants per ms/subframe), the downlink scheduling rate after 240 ms may be 0.18 or 18% (i.e. 44 grants/240 ms, or 0.18 grants per ms/subframe), and so forth. Thus, the UE may enter the ARx standby state a short time before the 160 ms sample time, at which point the downlink scheduling rate exceeds 10%. The downlink scheduling rate corresponding to each sampled time may also be a filtered quantity (e.g. a weighted average of current and prior sampled rates). For instance, the downlink scheduling rate may be calculated such that the number of grants more recently received are given less weight than the number of grants less recently received.

When downlink traffic arrives in bursts, the relative number of grants received between sampled times may frequently increase and decrease, such as illustrated in FIG. 4A. Thus, the downlink scheduling rate over time may increase during traffic bursts and decrease at other times, for instance, ranging generally between rates of 0.2 and 0.1 as illustrated in the example of FIG. 4B. Although not shown, in some cases the scheduling rate may also drop below this range (e.g. below 0.10) or in some cases significantly below this range (e.g. below 0.02) at times when bursts of downlink traffic are infrequent. This drop in downlink burst frequency and thus the scheduling rate may cause the UE to transition from the ARx standby state to the ARx disallowed state (or even the force R1 state). If the downlink burst frequency later increases, the UE may transition back from the force R1 state or ARx disallowed state to the ARx standby state.

Each macro state (e.g. ARx standby and ARx disallowed) may have different sub-states or modes, including a steady state and a fallback state. The steady state is a default sub-state which the UE enters when it expects downlink traffic (e.g. when the UE receives a downlink grant). While in the steady state, the UE may select one of the default Rx states of the corresponding macro state. For example, the UE may select between 4Rx and best2Rx while in the steady state of the ARx standby state, or baseline 2Rx while in the steady state of the ARx disallowed state.

In contrast, the fallback state is a sub-state which the UE enters when downlink traffic is idle. For example, the UE may enter the fallback state if the UE has not received a downlink grant within a threshold number of subframes. While in the fallback state, the UE may be restricted to selecting 1Rx (e.g. in a conditional 1Rx mode). Thus, the UE may save more power in the fallback state (e.g. with 1Rx) than when the UE is in the steady state (e.g. with 4Rx or best2Rx). In some cases, while in the fallback state, the UE may also select baseline2Rx as an alternative to 1Rx to maintain PDCCH reception performance.

The UE may switch between the steady state and fallback state for a given macro state based on a downlink traffic pattern for that macro state. The downlink traffic pattern refers to the number of downlink grants the UE receives over a threshold number of subframes. The threshold number of subframes may be configured by the base station and depend on the given macro state. For instance, the threshold may be 48 subframes for the ARx standby state and 20 subframes for the ARx disallowed state. The time period represented by this threshold number of subframes (e.g. 48 or 20 subframes) may be referred to as a fallback window. If a UE in the steady state for a given macro state does not receive a downlink grant within the fallback window for that macro state, the UE enters the fallback state. If the UE in the fallback state later receives a downlink grant, the UE re-enters the steady state.

Figure 5:
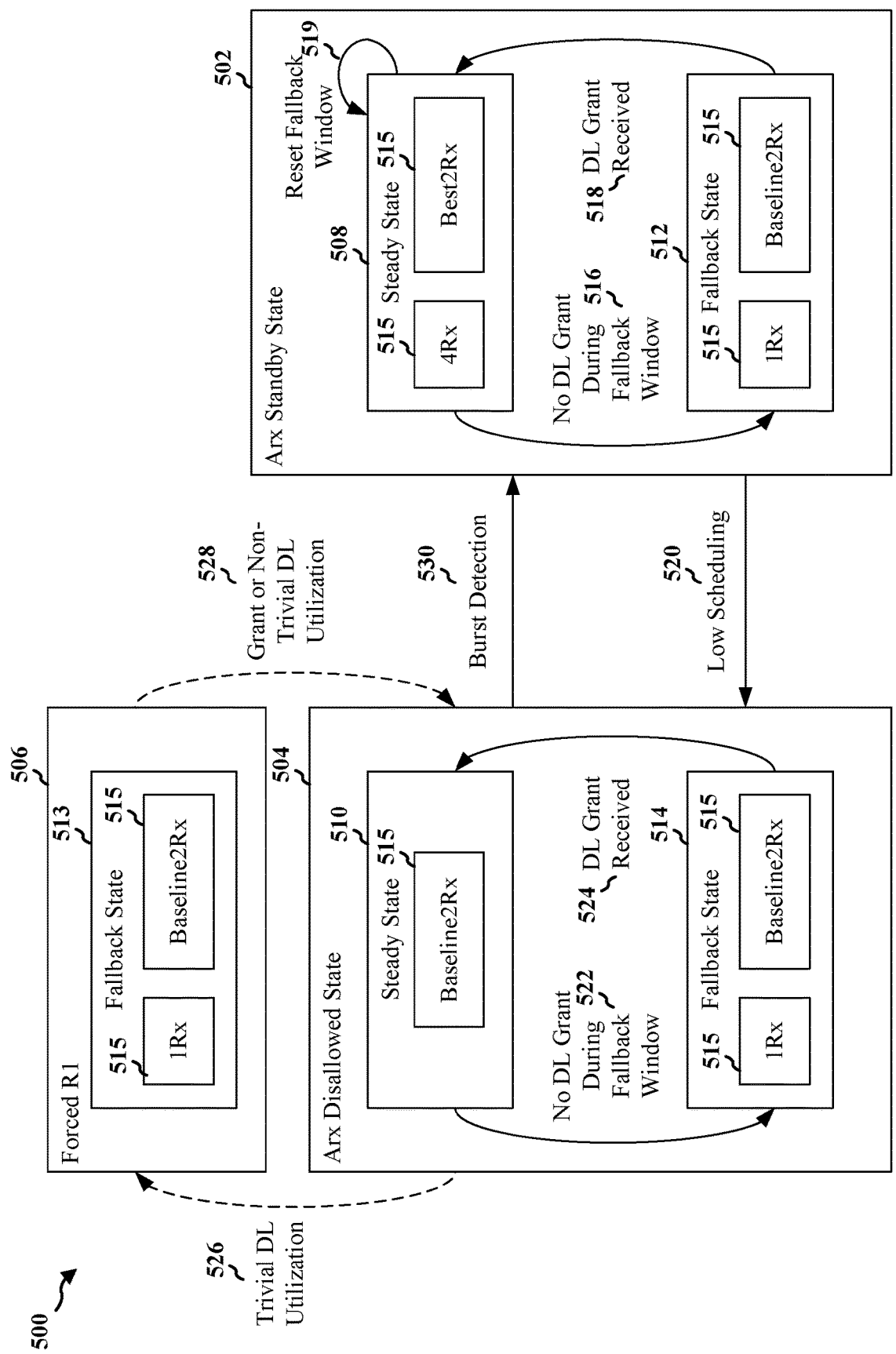
FIG. 5 is a diagram illustrating an example of an adaptive receive diversity state machine.

FIG. 5 illustrates an example 500 of an ARD state machine including macro states (e.g. an ARx standby state 502, an ARx disallowed state 504, and a forced R1 state 506), steady states 508, 510 and fallback states 512, 513, 514 within macro states, and Rx states 515 (e.g. 1Rx, baseline2Rx, best2Rx, 4Rx) within steady states and fallback states. The UE may transition between steady states 508, 510 and fallback states 512, 513, 514 within a given macro state depending on the downlink traffic pattern or fallback window as described above, while the UE may transition between different macro states depending on the downlink scheduling rate as described above.

In one example of operation, a UE with 4 reception antennas may initially be in the steady state 508 of the ARx standby state 502. While in the steady state 508, the UE may operate under 4Rx or best2Rx, and the UE may receive a burst of downlink data from the base station using the active antennas accordingly. After receiving the data, the UE may monitor for downlink grants during the fallback window for the ARx standby state 502 (e.g. 48 subframes or another configured threshold number of subframes). If the UE determines that it has not received any downlink grants during the fallback window, the UE may transition at 516 to the fallback state 512 of the ARx standby state 502. While in the fallback state 512, the UE may operate under 1Rx or baseline2Rx to save power until the UE later receives another downlink grant. Once the UE receives the grant (e.g. indicating a new data burst), the UE may transition at 518 back to the steady state 508 and receive the new data using 4Rx or best2Rx. The UE may also reset the fallback window at 519 and restart the monitoring for downlink grants.

Moreover, while the UE is operating in the ARx standby state 502, the UE may determine that the downlink scheduling rate has reduced to or below a first threshold (e.g. 10%). For instance, the UE may determine that the average number of grants received per subframe has dropped to less than 0.1, indicating a low scheduling rate. In such case, the UE may transition at 520 to the steady state 510 of the ARx disallowed state 504 to save power compared to the ARx standby state 502. While in the steady state 510, the UE may operate under baseline 2Rx and receive downlink data from the base station accordingly. The UE may also monitor for downlink grants during the fallback window for the ARx disallowed state (e.g. 20 subframes or another configured threshold number of subframes). If the UE determines that it has not received any downlink grants during the fallback window, the UE may transition at 522 to the fallback state 514 of the ARx disallowed state 504. While in the fallback state 514, the UE may operate under 1Rx or baseline2Rx to save additional power until the UE later receives another downlink grant and transitions at 524 back to the steady state 510.

Additionally, while the UE is operating in the ARx disallowed state 504, the UE may determine that the downlink scheduling rate has reduced to or below a second threshold (e.g. 2%). For instance, the UE may determine that the average number of grants received per subframe has dropped to less than 0.02, indicating trivial downlink utilization. In such case, the UE may transition at 526 to the forced R1 state 506 to save additional power compared to the ARx disallowed state 504. While in the forced R1 state 506, the UE may operate in fallback state 513 under 1Rx or baseline 2Rx and receive downlink data from the base station accordingly. If the UE later receives a downlink grant for MIMO rank 2 or above, or if the UE determines that the downlink scheduling rate has increased back above the second threshold (e.g. 2%), the UE may transition at 528 back to the steady state 510 of the ARx disallowed state 504. Similarly, while in the ARx disallowed state 504, if the UE subsequently determines that the downlink scheduling rate has increased back above the first threshold (e.g. 10%) in response to detecting a burst of data, the UE may transition at 530 back to the steady state 508 of the ARx standby state 502.

Generally, in ARD, the UE only reports CSF to the base station while in a steady state. For example, while the UE is in the steady state 508, the UE may report a MIMO rank of four to the base station in CSF indicating that the UE is operating under 4Rx. Therefore, if the UE later transitions from steady state 508 to fallback state 512, 513, 514 based on downlink traffic patterns or scheduling rates as described above, the UE may not report the downgrade from 4Rx to 1Rx/baseline2Rx in CSF while in the fallback state. Moreover, the UE may take a significant amount of time (e.g. 4-10 ms) to transition from the fallback state 512, 513, 514 back to the steady state 508 to again report CSF. As a result, misalignment or mismatch between the number of layers for transmission and the number of antennas for reception may occur during the transition time between steady states and fallback states. Such mismatch may be especially prominent when the UE has dropped from 4Rx to 1Rx.

Due to this mismatch or lack of synchronization with the base station, the UE may prune or discard numerous downlink grants on PDCCH. For instance, while the UE is in fallback state 512, 513, 514, the UE may discard 4 to 10 downlink grants during the 4 to 10 ms transition time back to steady state 508. Moreover, the UE may fail to successfully receive downlink data on PDSCH during this transition time, for instance, due to numerous decoding failures of CRCs on PDSCH. As a result, the UE may frequently discard the PDSCH data and transmit NACKs to the base station during ARQ or HARQ reporting. When the base station receives the NACKs from the UE, the base station may determine to adapt its downlink transmissions, such as in OLLA, by reducing the MCS of subsequent data transmissions, the number of allocated resource blocks for subsequent transmissions, the frequency of grants scheduling subsequent transmissions, or other parameters. Such adaptation may result in a degradation of downlink data throughput when the UE is back in the steady state.

Moreover, the lack of synchronization and degradation of downlink data throughput may be especially prominent in SCCs where high and low downlink traffic may be more intermittent (e.g. in bursts), than in PCCs where high downlink traffic may be more constant. For example, the UE may receive data from the base station over a PCC and multiple SCCs. For each PCC and SCC, the UE may initially be in the steady state of a given macro state, during which the UE may report a MIMO rank of 3 or 4 for each component carrier. If the UE later detects a low amount of downlink traffic on any of the SCCs (e.g. zero downlink grants within a threshold number of subframes), the UE may transition to the corresponding fallback state on those SCCs with a reduced number of active antennas (e.g. 1 or 2). As a result, the UE may experience a high PER (also referred to as BLER) due to frequent pruning or discarding of downlink grants on PDCCH and CRC decoding failures on PDSCH in these SCCs. While the UE may in some cases recover lost data on PDSCH in response to multiple HARQ-level retransmissions or other ARQ mechanism, the overall RTT for the UE to receive and successfully acknowledge the data may be increased. Additionally, TCP window sizes of the SCCs may be throttled at the transport layer due to the downgrade of number of antennas, resulting in an overall reduction of downlink throughput which may impact the UE experience. Persistent PER may also trigger OLLA (including reduction in MCS and scheduling as described above), which may further degrade downlink performance.

One approach that may improve downlink performance is to double the fallback window. For example, if the fallback window for the ARx standby state is increased from 48 ms (e.g., spanning 48 subframes) to 96 ms (e.g., spanning 96 subframes), the UE may remain in the steady state for twice the original amount of time before transitioning to the fallback state. As a result, the UE may remain in 4Rx for a longer amount of time, potentially reducing the PER and improving performance. Examples of possible PER reductions measured over a specified period of time for different SCCs are illustrated below in Tables 1 and 2. For instance, Table 1 illustrates an example where doubling the fallback window for one SCC has reduced PER by more than 15% during one period of time, while Table 2 illustrates a similar example where doubling the fallback window for another SCC has reduced PER by more than 12% during another period of time.

TABLE 1

|  | Default Fallback Window | Doubled Fallback Window | Delta |
|---|---|---|---|
| Packet Error Rate (PER) | 19.37% | 3.78% | −15.59% |
| Time in 4Rx | 37756 ms | 50974 ms | 13218 ms |
| Time in 4Rx with grant | 7947 ms | 9375 ms | 1428 ms |
| Time in 4Rx with grant/Time in 4Rx | 21% | 18% | −3% |

TABLE 2

|  | Default Fallback Window | Doubled Fallback Window | Delta |
|---|---|---|---|
| Packet Error Rate (PER) | 17.66% | 5.10% | −12.56% |
| Time in 4Rx | 15646 ms | 22047 ms | 6401 ms |
| Time in 4Rx with grant | 4131 ms | 4695 ms | 564 ms |
| Time in 4Rx with grant/Time in 4Rx | 26% | 21% | −5% |

However, while fixedly increasing the size of the fallback window may reduce PER, such static increase may also inefficiently increase UE power consumption. For example, if the fallback window in the ARx standby state is doubled such that the UE spends twice the original amount of time in 4Rx before switching to the fallback state, the UE may effectively double its power consumption (or halve its power savings). Such loss in power savings may be especially inefficient in SCCs where there may be downlink inactivity for frequent periods of time, during which the UE may burn additional power, reduce battery life, or possibly experience other thermal triggers.

To resolve the power inefficiencies associated with statically increasing the size of the fallback window in ARD as described above, the UE may employ a more dynamic approach to enhance ARD performance. For example, the UE may dynamically increase the size of the fallback window, and thus the amount of time the UE remains in a steady state 508, 510 before switching to a fallback state 512, 513, 514, based on a measurement of PER. PER refers to the number of erroneous packets or transport blocks which the UE receives with at least one bit error over the total number of received packets or transport blocks. For example, the UE may measure PER over a given period of time by counting the number of transport blocks which the UE fails to decode during that time (e.g. in response to a mismatch between the CRC attached to the transport block and an expected CRC calculated by the UE) and dividing that number by the total number of transport blocks received at the UE during that time. Thus, if the UE receives 10 transport blocks during a predetermined period of time and fails to decode 2 of these blocks (e.g. due to CRC mismatch), the UE may measure a PER of 20%. Depending on the measured PER, the UE may determine a scaling factor for the fallback window (e.g. 1x, 1.5x, or 2x of the size of the original fallback window). Accordingly, the UE may dynamically change the length of time that the UE remains in the steady state based on measured PER, rather than merely increasing the time by a fixed amount regardless of PER. In this way, balance between power savings and performance may be optimized.

For example, the UE may determine the PER to be in a low region if the UE measures the PER to be within a first range (e.g. below 2%), a middle region if the UE measures the PER to be within a second range higher than the first range (e.g. between 2% and 10%), and a high region if the UE measures the PER to be within a third range higher than the second range (e.g. above 10%). If the UE measures the PER to be in the low region, the UE may determine that PER is insignificant, and therefore the UE may maintain the current fallback window size (e.g. 1x scaling factor, such as 48 ms for ARx standby state or 20 ms for ARx disallowed state). If the UE measures the PER to be in the middle region, the UE may determine that PER is substantial but not significant, and therefore the UE may slightly increase the current fallback window size (e.g. 1.5x scaling factor, such as 72 ms for ARx standby state or 30 ms for ARx disallowed state). If the UE measures the PER to be in the high region, the UE may determine that PER is significant, and therefore the UE may further increase the current fallback window size (e.g. 2x scaling factor, such as 96 ms for ARx standby state or 40 ms for ARx disallowed state). In other examples, the UE may change the fallback window size by other factors (e.g. other than 1.5x or 2.0x) or for other PER regions (e.g. within other ranges than described above).

When employing the dynamic approach described above, the UE may detect and monitor PER periodically during the transition period from the fallback state to the steady state. The UE may change the fallback window size depending on the measured PER during this transition period. For example, if the UE takes a certain period of time (e.g. 4-10 ms) to transition from the fallback state 512, 513, 514 to the steady state 508 in the ARx standby state 502 as described above, the UE may measure PER during this period of time and change the fallback window size for future transitions based on the measured PER. Moreover, the UE may also measure a filtered PER (e.g. based on an infinite impulse response (IIR) filter or some other filter), and change the fallback window size depending on the measured, filtered PER. For instance, the UE may measure filtered PER as a weighted average of multiple sampled PERs, using different weights for current and prior samples, or in other ways. Based on the measured PER, the UE may increase or decrease the fallback window size accordingly to maintain a desired PER. Additionally, the UE may change the fallback window size depending on a variation in MCS for downlink transmissions. For example, if the UE determines that the base station has decreased MCS from 16QAM to QPSK in subsequent downlink transmissions (e.g. in OLLA), the UE may increase the fallback window size to reduce PER or otherwise remain for a longer time in the steady state to reduce the possibility of NACKs, thus causing the base station to increase MCS back to 16QAM. As a result, downlink data throughput may be improved.

The UE may also measure PER and change the fallback window size independently for different component carriers. For example, the UE may determine low region, middle region, or high region PER separately for PCC and for each SCC, and the UE may change the fallback window respectively within each PCC and SCC. Furthermore, the UE may periodically monitor various metrics and move between different ARD macro states based on one or more of the metrics. The metrics may include, for example, downlink traffic pattern, downlink scheduling rate, downlink utilization rate, rank (in MIMO), and SNR. As described above, downlink traffic pattern refers to the number of grants received over a threshold number of subframes, while downlink scheduling rate refers to the average number of grants received per subframe. Utilization rate refers to the number of received data bytes (by the UE) over the total number of transmitted data bytes (by the base station), which may be based on the number of active reception antennas and channel conditions (e.g. SNR). The UE may monitor these metrics and move between different macro states independently for different component carriers. For example, the UE may determine downlink traffic pattern, scheduling rate, utilization rate, MIMO rank, and SNR separately for PCC and for each SCC, and the UE may switch to a different macro state respectively within each PCC and SCC.

Furthermore, the UE may disable switching to a fallback state of a given macro state based on the measured PER, as well as based on one or more of the other aforementioned metrics such as downlink scheduling rate, rank, and SNR. For example, the UE may determine whether to disable switching to a fallback state depending on the aforementioned region (e.g. low, middle, or high) the UE determines for the PER. For example, if the UE measures the PER to be in the low region, the UE may determine that PER is insignificant, and therefore the UE may allow transitions to the fallback state. Thus, the UE may transition from the steady state to the fallback state if the UE does not receive a downlink grant within the dynamic fallback window. If the UE measures the PER to be in the high region, the UE may determine that PER is significant, and therefore the UE may disable switching to the fallback state. Thus, the UE may remain in the steady state even if the UE does not receive a downlink grant within the dynamic fallback window. On the other hand, if the UE measures the PER to be in the middle region, the UE may determine that PER is substantial, and therefore the UE may determine to disable switching depending on the other metrics described above. For example, the UE may determine whether the downlink scheduling rate is low (e.g. less than 20% or some other threshold), the SNR is high (e.g. greater than 10 decibels (dB) or some other threshold), and the MIMO rank is low (e.g. RI<=2 or some other threshold). If all of these conditions are met, the UE may allow switching to the fallback state. Otherwise, the UE may disable transitioning to the fallback state. When the UE disables transitioning to the fallback state (in either the middle or high region of PER), the UE may again allow transitioning to the fallback state if the aforementioned conditions later become met or the PER drops to a lower value.

Figure 6:
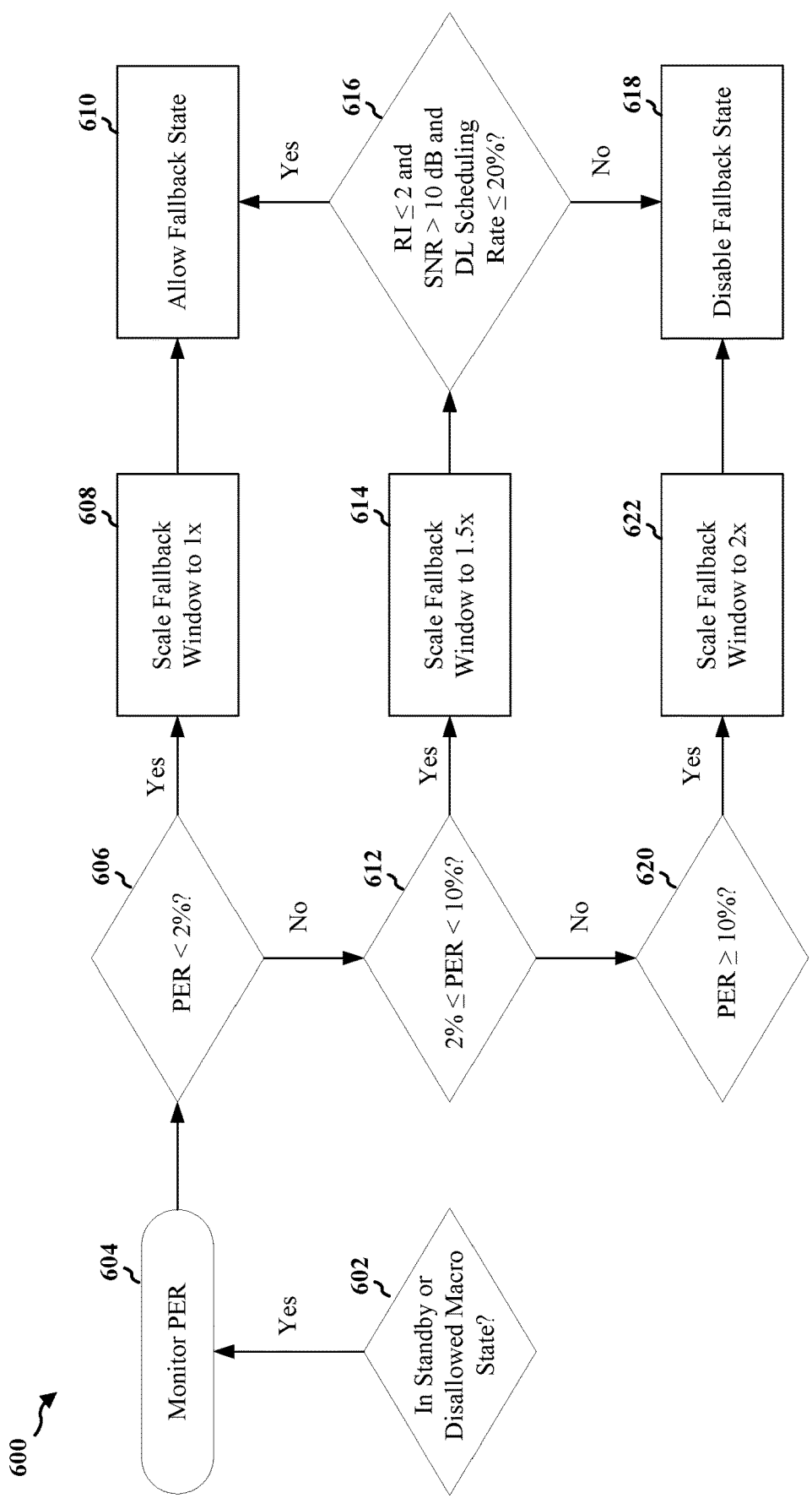
FIG. 6 is a flowchart of a process for dynamically increasing fallback window size and disabling fallback state transitions based on PER.

FIG. 6 illustrates an example 600 of a process for dynamically increasing fallback window size and disabling fallback state transitions based on PER. At 602, the UE determines whether the UE is in a standby macro state (e.g. ARx standby state 502) or disallowed macro state (e.g. ARx disallowed state 504). If so, at 604, the UE monitors PER. For example, the UE may measure and filter a number of packets lost over a period of time during which the UE transitions from a fallback state to a steady state. After the UE measures the PER, the UE first determines at 606 whether the measured PER is less than 2% (e.g. within a low region). If so, at 608, the UE changes the fallback window for the current macro state to its default value (e.g. 1x scaling). Moreover, at 610, the UE refrains from disabling (or allows) switching to the fallback state of the given macro state. Alternatively, if at 606 the UE determines that the measured PER is not within the low region, then at 612, the UE determines whether the measured PER is at least 2% and less than 10% (e.g. within a middle region). If so, then at 614, the UE slightly increases the fallback window for the current macro state with respect to the default value (e.g. 1.5x scaling). Moreover, at 616, the UE determines whether to refrain from disabling switching to the fallback state based on other metrics such as MIMO rank, SNR, and downlink scheduling rate. For instance, the UE may check whether the rank is at most 2, whether the SNR is at least 10 dB, and whether the scheduling rate is at most 20%. If all these conditions are met, then the UE allows switching to the fallback state at 610. On the other hand, if any of these conditions are not met, then at 618, the UE disables switching to the fallback state. Moreover, if at 612 the UE determines that the measured PER is not within the middle region, then at 620, the UE determines whether the measured PER is at least 10% (e.g. within a high region). If so, then at 622, the UE further increases the fallback window for the current macro state with respect to the default value (e.g. 2x scaling), and disables switching to the fallback state at 618. Alternatively, the UE may simply conclude that the measured PER is within a high region upon determining the measured PER to not be within the low or middle regions (e.g., block 620 may be omitted).

Figure 7:
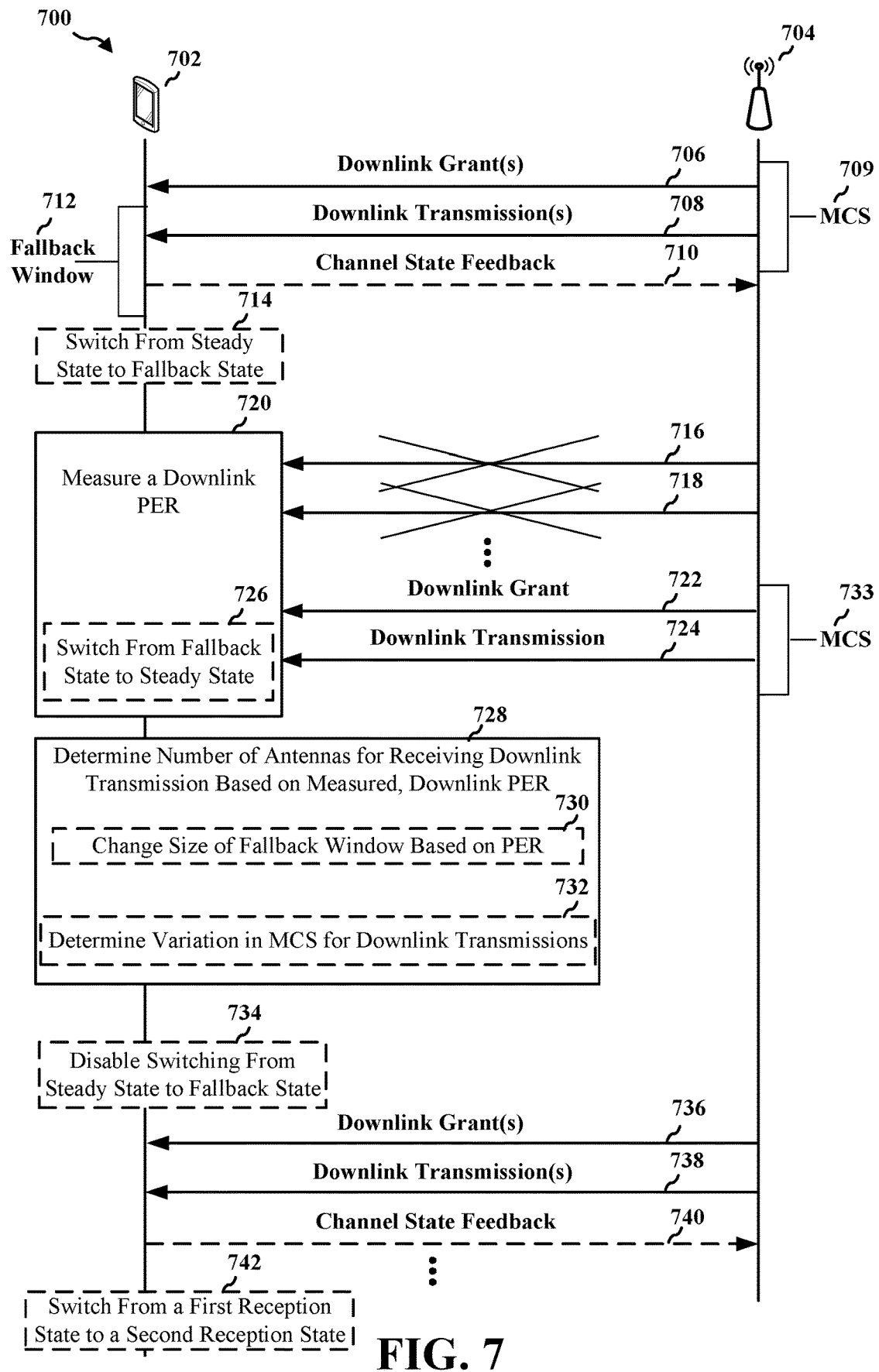
FIG. 7 is a call flow diagram between a UE and a base station.

FIG. 7 is an example 700 of a call flow between a UE 702 and a base station 704. Initially, the UE 702 may be in the steady state of a given macro state and include an active number of reception antennas. For example, referring to FIG. 5, the UE may be in the steady state 508 of the ARx standby state 502, during which the UE may be in a 4Rx state or a best2Rx state. While in the steady state, the UE may receive one or more downlink grants 706 each scheduling a downlink transmission 708 from the base station 704. The base station 704 may transmit the downlink grants and downlink transmission according to a configured MCS 709 (e.g. 16QAM). The UE may also send CSF 710 to the base station indicating the current rank of the UE for MIMO (e.g. 3 or 4) as well as other channel state information.

After the UE 702 receives each downlink grant(s) 706, the UE may count an amount of time (or number of subframes) that has elapsed within a fallback window 712. If the UE receives a subsequent downlink grant during this time, the UE may reset the fallback window 712 and restart counting. Otherwise, the UE transitions to the fallback state. In the example of FIG. 7, the UE has not received another downlink grant within the fallback window 712, and therefore at 714, the UE switches from the steady state to the fallback state. For example, referring to FIG. 5, the UE may transition from the steady state 508 to the fallback state 512 at 516, during which the UE may be restricted to 1Rx or baseline2Rx. The UE may not report CSF to the base station of the change in MIMO rank at this time, leading to possible misalignment between the number of reception antennas at the UE and the number of layers for transmission at the base station. Thus, pruned or discarded PDCCH transmissions (e.g. downlink grants 716) and unsuccessfully decoded PDSCH transmissions (e.g. downlink transmissions 718) may result.

At 720, the UE measures a downlink PER. For example, while in the fallback state, the UE may receive multiple downlink grants scheduling downlink transmissions, some of which include at least one bit error (e.g. downlink grants 716 and downlink transmissions 718) and others which do not include a bit error (e.g. downlink grants 722 and downlink transmissions 724). In such case, the UE may measure PER by counting the number of downlink grants 716 and downlink transmissions 718 and dividing that value by the total number of downlink grants 716, 722 and downlink transmissions 718, 724. The UE may alternatively measure PER in other ways (e.g. by only counting downlink grants).

While the UE is receiving downlink grants 716, 722 and downlink transmissions 718, 724 and measuring PER at 720, the UE also determines whether to switch from the fallback state back to the steady state. In the example of FIG. 7, the UE successfully receives downlink grant 722, and therefore at 726, the UE switches from the fallback state to the steady state. For example, referring to FIG. 5, while in the ARx standby state 502 and at 518, the UE transitions from fallback state 512 back to steady state 508 in response to receiving the downlink grant from the base station.

At 728, the UE determines a number of antennas for receiving downlink transmissions based on the measured, downlink PER. For example, referring to FIG. 5, the UE may determine an Rx state 515 (e.g. 4Rx, best2Rx, baseline2Rx, or 1Rx) for a given macro state depending on whether the UE is in the steady state 508, 510 or fallback state 512, 513, 514. For instance, while in the steady state 508, the UE may select 4Rx or best2Rx, and while in the fallback state 512, 513, 514, the UE may select 1Rx or baseline2Rx. The Rx state 515 may depend on the amount of time the UE remains in the steady state 508, 510, which in turn may dynamically change based on the PER measured at 720. For example, the UE may scale the fallback window 712 differently (e.g. 1×, 1.5×, or 2× the size of the original fallback window) depending on the measured PER, which may lengthen the amount of time the UE is in a steady state when a downlink grant has not been received. Thus, when the fallback window is scaled to be twice as long in response to the measured PER, the UE may remain for a longer amount of time in the steady state 508 and thus determine to select four antennas (e.g. 4Rx), rather than transition earlier to the fallback state 512, 513, 514 with restriction to only one or two antennas (e.g. 1Rx or baseline2Rx). Accordingly, the UE may determine the number of antennas corresponding to Rx state 515 based on the measured PER at 720.

For instance, at 730, the UE may change the size of fallback window 712 based on the PER measured at 720. For example, referring to FIG. 6, after the UE measures the PER, the UE may first determine at 606 whether the measured PER is less than 2% (e.g. within a low region). If so, at 608, the UE changes the fallback window for the current macro state to its default value (e.g. 1× scaling). Alternatively, if at 606 the UE determines that the measured PER is not within the low region, then at 612, the UE may determine whether the measured PER is at least 2% and less than 10% (e.g. within a middle region). If so, then at 614, the UE slightly increases the fallback window for the current macro state with respect to the default value (e.g. 1.5× scaling). Alternatively, if at 612 the UE determines that the measured PER is not within the middle region, then at 620, the UE may determine whether the measured PER is at least 10% (e.g. within a high region). If so, then at 622, the UE further increases the fallback window for the current macro state with respect to the default value (e.g. 2× scaling). In other examples, the UE may change the fallback window size by other factors (e.g. other than 1.5× or 2.0×) or for other PER regions (e.g. within other ranges corresponding to other percentages of PER than described above).

Moreover, at 732, the UE may determine a variation in MCS for downlink transmissions. For instance, when the UE prunes or discards PDCCH transmissions such as downlink grants 716 and unsuccessfully decodes PDSCH transmissions such as downlink transmissions 718, the UE may send a NACK to the base station requesting re-transmission. Accordingly, to improve the likelihood of a successful subsequent reception at the UE, the base station may re-transmit the downlink grants or transmissions according to a different MCS 733. The base station may also transmit subsequent downlink grants and transmissions according to the different MCS. For instance, when transmitting downlink grant 722 and downlink transmission 724, the base station may reconfigure the MCS from 16QAM to QPSK to increase the likelihood of successful reception. Thus, at 732, the UE may determine the variation between a previous MCS (e.g. configured MCS 709) and a current MCS (e.g. different MCS 733) for downlink transmissions. For example, the UE may determine that the MCS has varied from 16QAM to QPSK.

The UE may determine the number of antennas for receiving downlink transmissions at 728 based on the variation in MCS determined at 732. For example, if the UE determines that the MCS has decreased (e.g. from 16QAM to QPSK or some other MCS) between MCS 709 and MCS 733, the UE may determine to increase the scaling factor of the fallback window 712 (e.g. as described above at 730) and thus the length of time the UE remains in the steady state. As a result, the UE may remain for a longer amount of time in the steady state and thus determine to select four antennas (e.g. 4Rx), rather than transitioning sooner to the fallback state and thus being restricted to selecting only one or two antennas (e.g. 1Rx or baseline2Rx). Contrarily, if the UE determines that the MCS has increased between MCS 709 and MCS 733, the UE may determine to decrease the scaling factor of the fallback window 712 and thus similarly the length of time that the UE remains in the steady state. Accordingly, the UE may determine the number of antennas corresponding to Rx state 515 based on variation in MCS as well as the measured PER.

At 734, the UE may disable switching from the steady state to the fallback state. For example, referring to FIG. 6, if the UE determines at 612 that the measured PER is at least 2% and less than 10% (e.g. within a middle region), then at 616, the UE may determine whether to refrain from disabling switching to the fallback state based on MIMO rank, SNR, and downlink scheduling rate. For instance, the UE may check whether the rank is at most 2, whether the SNR is at least 10 dB, and whether the scheduling rate is at most 20%. The UE may alternatively check one or two of these conditions, other conditions (e.g. downlink traffic pattern and utilization rate), or any combination of the these conditions. If any of these conditions are not met, then at 618, the UE disables switching to the fallback state. Alternatively, if the UE determines at 620 that the measured PER is at least 10% (e.g. within a high region), then at 622, the UE may simply disable switching to the fallback state at 618 without checking any of the aforementioned conditions. In other examples, the UE may determine whether to disable switching to the fallback state based on conditions for other PER regions (e.g. within other ranges corresponding to other percentages of PER than described above).

Accordingly, after the UE 702 determines the number of antennas at 728, the UE may receive one or more downlink grants 736 each scheduling a downlink transmission 738 based on the determined number of antennas. For example, if the UE determines to operate under 4Rx while in the steady state of the ARx standby state (which determination is based on the measured PER or MCS variation as described above), the UE may receive downlink grant(s) 736 and downlink transmission(s) 738 using four antennas. The UE may also transmit CSF 740 while in the steady state informing the base station of the current rank of the UE as well as other channel state information.

Thus, the UE may periodically receive bursts of downlink data from the base station with a balance of power consumption and performance. However, as described above with respect to FIGS. 4A and 4B, if the UE determines that the downlink scheduling rate of downlink grants 736 received in various bursts decreases below a threshold, then at 742, the UE may switch to a different reception state (macro state) to save power. For instance, referring to FIG. 5, if the downlink scheduling rate drops below 10%, the UE may transition at 520 from the ARx standby state 502 to the ARx disallowed state 504, and if the downlink scheduling rate further drops below 2%, the UE may transition at 526 from the ARx disallowed state 504 to the force R1 state 506. The UE may also transition between macro states based on other metrics than the downlink scheduling rate (e.g. downlink traffic pattern, utilization rate, MIMO rank, or SNR).

Figure 8:
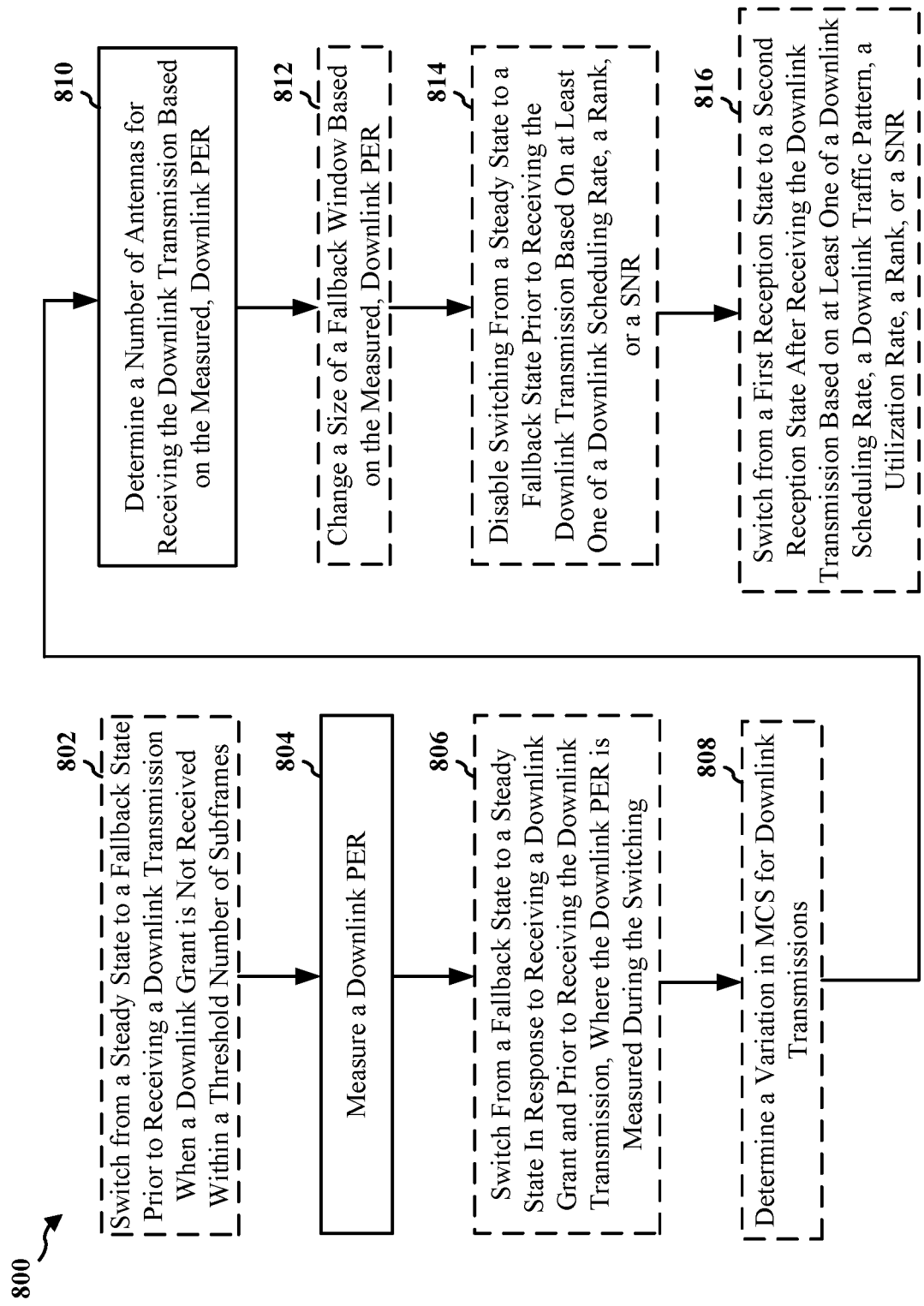
FIG. 8 is a flowchart of a method of wireless communication.

FIG. 8 is a flowchart 800 of a method of wireless communication. The method may be performed by a UE (e.g., the UE 104, 350, 702; the apparatus 902). Optional aspects are illustrated in dashed lines. The method allows a UE to employ a dynamic approach to ARD based on measured PER in order to optimize balancing between power savings and performance.

At 802, the UE may switch from a steady state to a fallback state prior to receiving a downlink transmission (e.g., downlink transmission 738) when a downlink grant is not received within a threshold number of subframes. For example, 802 may be performed by steady state component 940. For instance, referring to FIG. 7, after the UE 702 receives each downlink grant(s) 706, the UE may count an amount of time (or number of subframes) that has elapsed within a fallback window 712 (a threshold number of subframes). If the UE receives a subsequent downlink grant during this time, the UE may reset the fallback window 712 and restart counting. Otherwise, the UE transitions to the fallback state. In the example of FIG. 7, the UE has not received another downlink grant within the fallback window 712, and therefore at 714, the UE switches from the steady state to the fallback state. For example, referring to FIG. 5, the UE may transition from the steady state 508 to the fallback state 512 at 516, during which the UE may be restricted to 1Rx or baseline2Rx.

At 804, the UE measures a downlink PER. For example, 804 may be performed by measurement component 942. For instance, referring to FIG. 7, at 720, the UE may measure a downlink PER. For example, while in the fallback state, the UE may receive multiple downlink grants scheduling downlink transmissions, some of which include at least one bit error (e.g. downlink grants 716 and downlink transmissions 718) and others which do not (e.g. downlink grants 722 and downlink transmissions 724). In such case, the UE may measure PER by counting the number of downlink grants 716 and downlink transmissions 718 and dividing that value by the total number of downlink grants 716, 722 and downlink transmissions 718, 724. The UE may alternatively measure PER in other ways (e.g. by only counting downlink grants).

At 806, the UE may switch from a fallback state to a steady state in response to receiving a downlink grant and prior to receiving the downlink transmission (e.g., downlink transmission 738), where the downlink PER is measured at 804 during the switching. For example, 806 may be performed by fallback state component 944. For instance, referring to FIG. 7, while the UE is receiving downlink grants 716, 722 and downlink transmissions 718, 724 and measuring PER at 720, the UE also determines whether to switch from the fallback state back to the steady state. In the example of FIG. 7, the UE successfully receives downlink grant 722, and therefore at 726, the UE switches from the fallback state to the steady state. For example, referring to FIG. 5, while in the ARx standby state 502 and at 518, the UE transitions from fallback state 512 back to steady state 508 in response to receiving the downlink grant from the base station.

At 808, the UE may determine a variation in MCS for downlink transmissions. For example, 808 may be performed by MCS component 946. For instance, referring to FIG. 7, at 732, the UE may determine a variation in MCS for downlink transmissions. For instance, when the UE prunes or discards PDCCH transmissions such as downlink grants 716 and unsuccessfully decodes PDSCH transmissions such as downlink transmissions 718, the UE may send a NACK to the base station requesting re-transmission. Accordingly, to improve the likelihood of a successful subsequent reception at the UE, the base station may re-transmit the downlink grants or transmissions according to a different MCS 733. The base station may also transmit subsequent downlink grants and transmissions according to the different MCS. For instance, when transmitting downlink grant 722 and downlink transmission 724, the base station may reconfigure the MCS from 16QAM to QPSK to increase the likelihood of successful reception. Thus, at 732, the UE may determine the variation between a previous MCS (e.g. configured MCS 709) and a current MCS (e.g. different MCS 733) for downlink transmissions 708, 724. For example, the UE may determine that the MCS has varied from 16QAM to QPSK.

At 810, the UE determines a number of antennas for receiving a downlink transmission (e.g., downlink transmission 738) based on the measured, downlink PER. For example, 810 may be performed by determination component 948. For instance, referring to FIG. 7, at 728, the UE determines a number of antennas for receiving downlink transmissions 738 based on the measured, downlink PER. For example, referring to FIG. 5, the UE may determine an Rx state 515 (e.g. 4Rx, best2Rx, baseline2Rx, or 1Rx) for a given macro state depending on whether the UE is in the steady state 508, 510 or fallback state 512, 513, 514. For instance, while in the steady state 508, the UE may select 4Rx or best2Rx, and while in the fallback state 512, 513, 514, the UE may select 1Rx or baseline2Rx. The Rx state 515 may depend on the amount of time the UE remains in the steady state 508, 510, which in turn may dynamically change based on the PER measured at 720. For example, the UE may scale the fallback window 712 differently (e.g. 1×, 1.5×, or 2× the size of the original fallback window) depending on the measured PER, which may lengthen the amount of time the UE is in a steady state when a downlink grant has not been received. Thus, when the fallback window is scaled to be twice as long in response to the measured PER, the UE may remain for a longer amount of time in the steady state 508 and thus determine to select four antennas (e.g. 4Rx), rather than transition earlier to the fallback state 512, 513, 514 with restriction to only one or two antennas (e.g. 1Rx or baseline2Rx). Accordingly, the UE may determine the number of antennas corresponding to Rx state 515 based on the measured PER at 720.

The number of antennas may be determined further based on the variation in MCS (determined at 808). For instance, referring to FIG. 7, the UE may determine the number of antennas for receiving downlink transmissions at 728 based on the variation in MCS determined at 732. For example, if the UE determines that the MCS has decreased (e.g. from 16QAM to QPSK or some other MCS) between MCS 709 and MCS 733, the UE may determine to increase the scaling factor of the fallback window 712 (e.g. as described above at 730) and thus the length of time the UE remains in the steady state. As a result, the UE may remain for a longer amount of time in the steady state and thus determine to select four antennas (e.g. 4Rx), rather than transitioning sooner to the fallback state and thus being restricted to selecting only one or two antennas (e.g. 1Rx or baseline2Rx). Contrarily, if the UE determines that the MCS has increased between MCS 709 and MCS 733, the UE may determine to decrease the scaling factor of the fallback window 712 and thus similarly the length of time that the UE remains in the steady state. Accordingly, the UE may determine the number of antennas corresponding to Rx state 515 based on variation in MCS as well as the measured PER.

At 812, the UE may change a size of a fallback window based on the measured, downlink PER. For example, 812 may be performed by fallback window component 950. The changing may be performed independently for different component carriers. For instance, referring to FIG. 7, at 730, the UE may change the size of fallback window 712 based on the PER measured at 720 separately for each PCC and individual SCC. For example, referring to FIG. 6, after the UE measures the PER for a given SCC, the UE may first determine at 606 whether the measured PER is less than 2% (e.g. within a low region). If so, at 608, the UE changes the fallback window for the current macro state to its default value (e.g. 1x scaling) in the given SCC. Alternatively, if at 606 the UE determines that the measured PER is not within the low region, then at 612, the UE may determine whether the measured PER is at least 2% and less than 10% (e.g. within a middle region). If so, then at 614, the UE slightly increases the fallback window for the current macro state with respect to the default value (e.g. 1.5× scaling) in the given SCC. Alternatively, if at 612 the UE determines that the measured PER is not within the middle region, then at 620, the UE may determine whether the measured PER is at least 10% (e.g. within a high region). If so, then at 622, the UE further increases the fallback window for the current macro state with respect to the default value (e.g. 2× scaling) in the given SCC. In other examples, the UE may change the fallback window size by other factors (e.g. other than 1.5× or 2.0×) or for other PER regions (e.g. within other ranges corresponding to other percentages of PER than described above).

At 814, the UE may disable switching from a steady state to a fallback state prior to receiving the downlink transmission (e.g., downlink transmission 738) based on at least one of a downlink scheduling rate, a rank (for MIMO), or a signal to noise ratio. For example, 814 may be performed by fallback state disabler component 952. The disabling switching may further be based on the measured, downlink PER. For instance, referring to FIG. 7, at 734, the UE may disable switching from the steady state to the fallback state. For example, referring to FIG. 6, if the UE determines at 612 that the measured PER is at least 2% and less than 10% (e.g. within a middle region), then at 616, the UE may determine whether to refrain from disabling switching to the fallback state based on MIMO rank, SNR, and downlink scheduling rate. For instance, the UE may check whether the rank is at most 2, whether the SNR is at least 10 dB, and whether the scheduling rate is at most 20%. The UE may alternatively check one or two of these conditions, other conditions (e.g. downlink traffic pattern and utilization rate), or any combination of the these conditions. If any of these conditions are not met, then at 618, the UE disables switching to the fallback state. Alternatively, if the UE determines at 620 that the measured PER is at least 10% (e.g. within a high region), then at 622, the UE may simply disable switching to the fallback state at 618 without checking any of the aforementioned conditions. In other examples, the UE may determine whether to disable switching to the fallback state based or not on conditions for other PER regions (e.g. within other ranges corresponding to other percentages of PER than described above).

Finally, at 816, the UE may switch from a first reception state to a second reception state after receiving the downlink transmission (e.g., downlink transmission 738) based on at least one of a downlink scheduling rate, a downlink traffic pattern, a utilization rate, a rank (for MIMO), or a signal to noise ratio. For example, 816 may be performed by reception state component 954. The first reception state may comprise an ARx standby state, and the second reception state may comprise an ARx disallowed state. The switching may be performed independently for different component carriers. For instance, referring to FIG. 7, the UE may periodically receive bursts of downlink data from the base station in individual SCCs. However, as described above with respect to FIGS. 4A and 4B, if the UE determines for a given SCC that the downlink scheduling rate of downlink grants 736 received in various bursts decreases below a threshold, then at 742, the UE may switch to a different reception state (macro state) to save power in that SCC. For instance, referring to FIG. 5, if the downlink scheduling rate drops below 10% for a given SCC, the UE may transition at 520 from the ARx standby state 502 to the ARx disallowed state 504 for that SCC, and if the downlink scheduling rate further drops below 2%, the UE may transition at 526 from the ARx disallowed state 504 to the force R1 state 506 for that SCC. The UE may also transition between macro states based on other metrics than the downlink scheduling rate (e.g. downlink traffic pattern, utilization rate, rank, or SNR) for each SCC.

Figure 9:
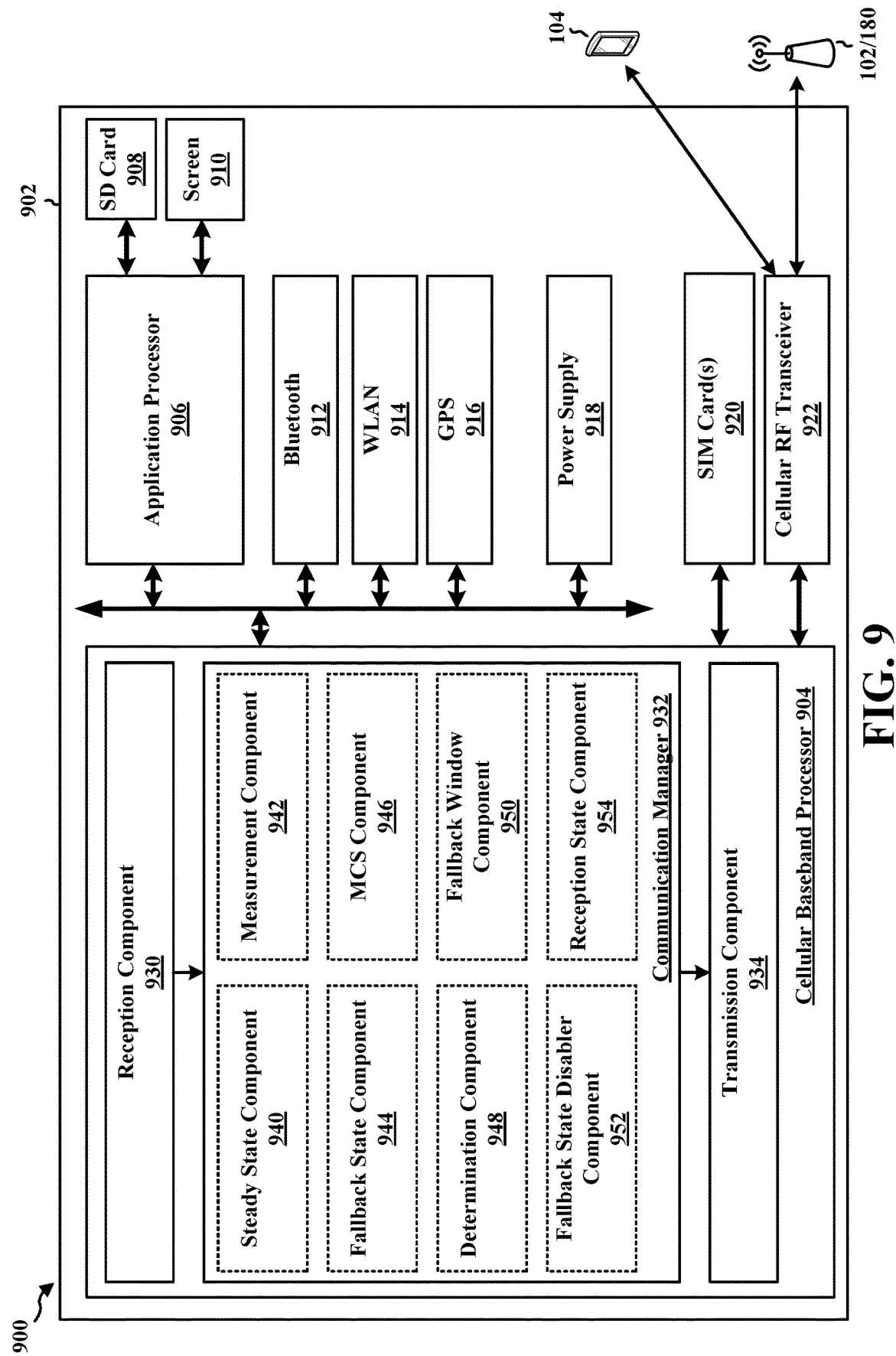
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a steady state component 940 that is configured to switch from a steady state to a fallback state prior to receiving a downlink transmission when a downlink grant is not received within a threshold number of subframes, e.g., as described in connection with 802. The communication manager 932 further includes a measurement component 942 that is configured to measure a downlink PER, e.g., as described in connection with 804. The communication manager 932 further includes a fallback state component 944 that receives input in the form of the downlink PER from the measurement component 942 and is configured to switch from a fallback state to a steady state in response to receiving a downlink grant and prior to receiving the downlink transmission, e.g., as described in connection with 806. The measurement component 942 is further configured to measure the downlink PER during the switching performed by the fallback state component 944, e.g., as described in connection with 804 and 806. The communication manager 932 further includes a MCS component 946 that is configured to determine a variation in MCS for downlink transmissions, e.g., as described in connection with 808.

The communication manager 932 further includes a determination component 948 that receives input in the form of the downlink PER from the measurement component 942 and is configured to determine a number of antennas for receiving a downlink transmission based on the measured, downlink PER, e.g., as described in connection with 810. The determination component 948 also is configured to determine the number of antennas further based on the variation in MCS determined by MCS component 946, e.g., as described in connection with 808 and 810. The communication manager 932 further includes a fallback window component 950 that receives input in the form of the downlink PER from the measurement component 942 and is configured to change a size of a fallback window based on the measured, downlink PER, e.g., as described in connection with 812. The fallback window component 950 is further configured to perform the changing independently for different component carriers, e.g., as described in connection with 812. The communication manager 932 further includes a fallback state disabler component 952 that is configured to disable switching from a steady state to a fallback state prior to receiving the downlink transmission based on at least one of a downlink scheduling rate, a rank, or a signal to noise ratio, e.g., as described in connection with 814. The fallback state disabler component 952 also receives input in the form of the downlink PER from the measurement component 942 and is further configured to disable the switching from the steady state to the fallback state based on the measured, downlink PER, e.g., as described in connection with 804 and 814. The communication manager 932 further includes a reception state component 954 that is configured to switch from a first reception state to a second reception state after receiving the downlink transmission based on at least one of a downlink scheduling rate, a downlink traffic pattern, a utilization rate, a rank, or a signal to noise ratio, e.g., as described in connection with 816. The reception state component 954 is further configured to perform the switching independently for different component carriers, e.g., as described in connection with 816.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for measuring a downlink packet error rate (PER); and means for determining a number of antennas for receiving a downlink transmission based on the measured, downlink PER. In one configuration, the means for determining may be configured to determine a variation in modulation coding schemes (MCS) for downlink transmissions, wherein the number of antennas may be determined further based on the variation in MCS.

In one configuration, the apparatus 902, and in particular the cellular baseband processor 904, may include means for switching from a steady state to a fallback state prior to receiving the downlink transmission when a downlink grant is not received within a threshold number of subframes.

In one configuration, the apparatus 902, and in particular the cellular baseband processor 904, may include means for switching from a fallback state to a steady state in response to receiving a downlink grant and prior to receiving the downlink transmission, wherein the downlink PER is measured during the switching.

In one configuration, the apparatus 902, and in particular the cellular baseband processor 904, may include means for switching from a first reception state to a second reception state after receiving the downlink transmission based on at least one of a downlink scheduling rate, a downlink traffic pattern, a utilization rate, a rank, or a signal to noise ratio. In one configuration, the first reception state may comprise an advanced receiver (ARx) standby state, and the second reception state may comprise an ARx disallowed state. In one configuration, the switching may be performed independently for different component carriers.

In one configuration, the apparatus 902, and in particular the cellular baseband processor 904, may include means for changing a size of a fallback window based on the measured, downlink PER. In one configuration, the changing may be performed independently for different component carriers.

In one configuration, the apparatus 902, and in particular the cellular baseband processor 904, may include means for disabling switching from a steady state to a fallback state prior to receiving the downlink transmission based on at least one of a downlink scheduling rate, a rank, or a signal to noise ratio. In one configuration, the disabling switching may further be based on the measured, downlink PER.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Misalignment between the number of layers for transmission and the number of antennas for reception may occur during the transition time between steady states and fallback states in ARD. As a result, the UE may experience a high PER due to frequent pruning or discarding of downlink grants on PDCCH and CRC decoding failures on PDSCH. While fixedly disabling transitions to fallback states or fixedly increasing the size of fallback windows may reduce PER, such static increases may also inefficiently increase UE power consumption. To resolve these power inefficiencies, the UE may employ a more dynamic approach for employing ARD to provide an optimized balance between power savings and performance. Rx chains or numbers of antennas may be managed based on PER and other metrics (e.g. downlink scheduling rate, downlink traffic pattern, etc.), thereby maximizing UE reception performance with reduced PDCCH pruning and reduced PDSCH decoding failures while also maximizing power savings during low data scheduling. Additionally, improved downlink data throughput may be achieved due to the reduced PDCCH pruning and PDSCH decoding failures when the base station adapts subsequent downlink transmissions (e.g. based on OLLA).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: measuring a downlink packet error rate (PER); and determining a number of antennas for receiving a downlink transmission based on the measured, downlink PER.

Example 2 is the method of Example 1, further comprising: switching from a steady state to a fallback state prior to receiving the downlink transmission when a downlink grant is not received within a threshold number of subframes.

Example 3 is the method of Example 1, further comprising: switching from a fallback state to a steady state in response to receiving a downlink grant and prior to receiving the downlink transmission, wherein the downlink PER is measured during the switching.

Example 4 is the method of any of Examples 1 to 3, further comprising: switching from a first reception state to a second reception state after receiving the downlink transmission based on at least one of a downlink scheduling rate, a downlink traffic pattern, a utilization rate, a rank, or a signal to noise ratio.

Example 5 is the method of Example 4, wherein the first reception state comprises an advanced receiver (ARx) standby state, and wherein the second reception state comprises an ARx disallowed state.

Example 6 is the method of Examples 4 or 5, wherein the switching is performed independently for different component carriers.

Example 7 is the method of any of Examples 1 to 6, further comprising: changing a size of a fallback window based on the measured, downlink PER.

Example 8 is the method of Example 7, wherein the changing is performed independently for different component carriers.

Example 9 is the method of Example 1, further comprising: disabling switching from a steady state to a fallback state prior to receiving the downlink transmission based on at least one of a downlink scheduling rate, a rank, or a signal to noise ratio.

Example 10 is the method of Example 9, wherein the disabling switching is further based on the measured, downlink PER.

Example 11 is the method of any of Examples 1 to 10, further comprising: determining a variation in modulation coding schemes (MCS) for downlink transmissions, wherein the number of antennas is determined further based on the variation in MCS.

Example 12 is an apparatus for wireless communication, comprising: a processor; memory coupled with the processor; and instructions stored in the memory and operable, when executed by the processor, to cause the apparatus to: measure a downlink packet error rate (PER); and determine a number of antennas for receiving a downlink transmission based on the measured, downlink PER.

Example 13 is the apparatus of Example 12, wherein the instructions, when executed by the processor, further cause the apparatus to: switch from a steady state to a fallback state prior to receiving the downlink transmission when a downlink grant is not received within a threshold number of subframes.

Example 14 is the apparatus of Example 12, wherein the instructions, when executed by the processor, further cause the apparatus to: switch from a fallback state to a steady state in response to receiving a downlink grant and prior to receiving the downlink transmission, wherein the downlink PER is measured during the switching.

Example 15 is the apparatus of any of Examples 12 to 14, wherein the instructions, when executed by the processor, further cause the apparatus to: switch from a first reception state to a second reception state after receiving the downlink transmission based on at least one of a downlink scheduling rate, a downlink traffic pattern, a utilization rate, a rank, or a signal to noise ratio.

Example 16 is the apparatus of Example 15, wherein the first reception state comprises an advanced receiver (ARx) standby state, and wherein the second reception state comprises an ARx disallowed state.

Example 17 is the apparatus of Example 15 or 16, wherein the switching is performed independently for different component carriers.

Example 18 is the apparatus of any of Examples 12 to 17, wherein the instructions, when executed by the processor, further cause the apparatus to: change a size of a fallback window based on the measured, downlink PER.

Example 19 is the apparatus of Example 18, wherein the changing is performed independently for different component carriers.

Example 20 is the apparatus of Example 12, wherein the instructions, when executed by the processor, further cause the apparatus to: disable switching from a steady state to a fallback state prior to receiving the downlink transmission based on at least one of a downlink scheduling rate, a rank, or a signal to noise ratio.

Example 21 is the apparatus of Example 20, wherein the disabling switching is further based on the measured, downlink PER.

Example 22 is the apparatus of any of Examples 12 to 21, wherein the instructions, when executed by the processor, further cause the apparatus to: determine a variation in modulation coding schemes (MCS) for downlink transmissions, wherein the number of antennas is determined further based on the variation in MCS.

Example 23 is an apparatus for wireless communication, comprising: means for measuring a downlink packet error rate (PER); and means for determining a number of antennas for receiving a downlink transmission based on the measured, downlink PER.

Example 24 is the apparatus of Example 23, further comprising: means for switching from a steady state to a fallback state prior to receiving the downlink transmission when a downlink grant is not received within a threshold number of subframes.

Example 25 is the apparatus of Example 23, further comprising: means for switching from a fallback state to a steady state in response to receiving a downlink grant and prior to receiving the downlink transmission, wherein the downlink PER is measured during the switching.

Example 26 is the apparatus of any of Examples 23 to 25, further comprising: means for switching from a first reception state to a second reception state after receiving the downlink transmission based on at least one of a downlink scheduling rate, a downlink traffic pattern, a utilization rate, a rank, or a signal to noise ratio.

Example 27 is the apparatus of Example 26, wherein the first reception state comprises an advanced receiver (ARx) standby state, and wherein the second reception state comprises an ARx disallowed state.

Example 28 is the apparatus of Examples 26 or 27, wherein the switching is performed independently for different component carriers.

Example 29 is the apparatus of any of Examples 23 to 27, further comprising: means for changing a size of a fallback window based on the measured, downlink PER.

Example 30 is the apparatus of Example 29, wherein the changing is performed independently for different component carriers.

Example 31 is the apparatus of Example 23, further comprising: means for disabling switching from a steady state to a fallback state prior to receiving the downlink transmission based on at least one of a downlink scheduling rate, a rank, or a signal to noise ratio.

Example 32 is the apparatus of Example 31, wherein the disabling switching is further based on the measured, downlink PER.

Example 33 is the apparatus of any of Examples 23 to 32, wherein the means for determining is further configured to determine a variation in modulation coding schemes (MCS) for downlink transmissions, wherein the number of antennas is determined further based on the variation in MCS.

Example 34 is a computer-readable medium storing computer executable code, the code when executed by a processor cause the processor to: measure a downlink packet error rate (PER); and determine a number of antennas for receiving a downlink transmission based on the measured, downlink PER.

What is claimed is:

1. A method of wireless communication at a user equipment (UE), comprising:
    switching from a steady state to a fallback state prior to receiving a downlink transmission when a downlink grant is not received within a threshold number of subframes;
    measuring a downlink packet error rate (PER); and
    determining a number of active reception antennas corresponding to a reception state for receiving the downlink transmission based on the measured, downlink PER.

2. The method of claim 1, further comprising:
    switching from a first reception state to a second reception state after receiving the downlink transmission based on at least one of a downlink scheduling rate, a downlink traffic pattern, a utilization rate, a rank, or a signal to noise ratio.

3. The method of claim 2, wherein the first reception state comprises an advanced receiver (ARx) standby state, and wherein the second reception state comprises an ARx disallowed state.

4. The method of claim 2, wherein the switching from the first reception state to the second reception state is performed independently for different component carriers.

5. The method of claim 1, further comprising:
    changing a size of a fallback window based on the measured, downlink PER.

6. The method of claim 1, wherein the threshold number of subframes is independently determined for different component carriers.

7. The method of claim 1, further comprising:
    determining a variation in modulation coding schemes (MCS) for subsequent downlink transmissions, wherein the number of active reception antennas is determined further based on the variation in MCS.

8. An apparatus for wireless communication, comprising:
    a processor;
    memory coupled with the processor; and instructions stored in the memory and operable, when executed by the processor, to cause the apparatus to:
  switch from a steady state to a fallback state prior to receiving a downlink transmission when a downlink grant is not received within a threshold number of subframes;
  measure a downlink packet error rate (PER); and
  determine a number of active reception antennas corresponding to a reception state for receiving the downlink transmission based on the measured, downlink PER.

9. The apparatus of claim 8, wherein the instructions, when executed by the processor, further cause the apparatus to:
  switch from a first reception state to a second reception state after receiving the downlink transmission based on at least one of a downlink scheduling rate, a downlink traffic pattern, a utilization rate, a rank, or a signal to noise ratio.

10. The apparatus of claim 9, wherein the first reception state comprises an advanced receiver (ARx) standby state, and wherein the second reception state comprises an ARx disallowed state.

11. The apparatus of claim 9, wherein the switching from the first reception state to the second reception state is performed independently for different component carriers.

12. The apparatus of claim 8, wherein the instructions, when executed by the processor, further cause the apparatus to:
  change a size of a fallback window based on the measured, downlink PER.

13. The apparatus of claim 8, wherein the threshold number of subframes is independently determined for different component carriers.

14. The apparatus of claim 8, wherein the instructions, when executed by the processor, further cause the apparatus to:
  determine a variation in modulation coding schemes (MCS) for subsequent downlink transmissions, wherein the number of active reception antennas is determined further based on the variation in MCS.

15. An apparatus for wireless communication, comprising:
  means for switching from a steady state to a fallback state prior to receiving a downlink transmission when a downlink grant is not received within a threshold number of subframes;
  means for measuring a downlink packet error rate (PER); and
  means for determining a number of active reception antennas corresponding to a reception state for receiving the downlink transmission based on the measured, downlink PER.

16. The apparatus of claim 15, further comprising:
  means for switching from a first reception state to a second reception state after receiving the downlink transmission based on at least one of a downlink scheduling rate, a downlink traffic pattern, a utilization rate, a rank, or a signal to noise ratio.

17. The apparatus of claim 15, further comprising:
  means for changing a size of a fallback window based on the measured, downlink PER.

18. The apparatus of claim 15, wherein the means for determining is further configured to determine a variation in modulation coding schemes (MCS) for subsequent downlink transmissions, wherein the number of active reception antennas is determined further based on the variation in MCS.

19. A non-transitory computer-readable medium storing computer executable code, the code when executed by a processor cause the processor to:
  switch from a steady state to a fallback state prior to receiving a downlink transmission when a downlink grant is not received within a threshold number of subframes;
  measure a downlink packet error rate (PER); and
  determine a number of active reception antennas corresponding to a reception state for receiving the downlink transmission based on the measured, downlink PER.

20. A method of wireless communication at a user equipment (UE), comprising:
  measuring a downlink packet error rate (PER);
  determining a number of active reception antennas corresponding to a reception state for receiving a downlink transmission based on the measured, downlink PER; and
  switching from a fallback state to a steady state in response to receiving a downlink transmission grant and prior to receiving the downlink transmission, wherein the downlink PER is measured during the switching.

21. A method of wireless communication at a user equipment (UE), comprising:
  measuring a downlink packet error rate (PER);
  determining a number of active reception antennas corresponding to a reception state for receiving a downlink transmission based on the measured, downlink PER; and
  disabling switching from a steady state to a fallback state prior to receiving the downlink transmission based on at least one of a downlink scheduling rate, a rank, or a signal to noise ratio.

22. The method of claim 21, wherein the disabling is further based on the measured, downlink PER.

* * * * *